US011582721B2

(12) United States Patent
Balasubramanian et al.

(10) Patent No.: US 11,582,721 B2
(45) Date of Patent: Feb. 14, 2023

(54) SUPERPOSITION OF SIDELINK AND UPLINK TRANSMISSIONS

(71) Applicant: QUALCOMM Incorporated, San Diego, CA (US)

(72) Inventors: Anantharaman Balasubramanian, San Diego, CA (US); Shuanshuan Wu, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/185,061

(22) Filed: Feb. 25, 2021

(65) Prior Publication Data
US 2021/0282116 A1 Sep. 9, 2021

Related U.S. Application Data

(60) Provisional application No. 62/984,719, filed on Mar. 3, 2020.

(51) Int. Cl.
*H04W 72/02* (2009.01)
*H04W 72/04* (2023.01)
*H04W 72/044* (2023.01)
*H04L 1/00* (2006.01)
*H04W 72/0446* (2023.01)
*H04W 72/0453* (2023.01)

(Continued)

(52) U.S. Cl.
CPC ........... *H04W 72/02* (2013.01); *H04L 1/0004* (2013.01); *H04W 28/26* (2013.01); *H04W 72/0406* (2013.01); *H04W 72/0446* (2013.01); *H04W 72/0453* (2013.01); *H04W 72/0466* (2013.01); *H04W 72/14* (2013.01)

(58) Field of Classification Search
CPC . H04W 72/02; H04W 28/26; H04W 72/0406; H04W 72/0446; H04W 72/0453; H04W 72/0466; H04W 72/14; H04L 1/0004
See application file for complete search history.

(56) References Cited

U.S. PATENT DOCUMENTS 9,450,739 B2 * 9/2016 Kwon .................... H04L 5/0053
2015/0049736 A1 * 2/2015 Liu ....................... H04B 7/0413
370/331

(Continued)

*Primary Examiner* — Jael M Ulysse
(74) *Attorney, Agent, or Firm* — Danai Nelisile Mhembere; Holland & Hart LLP

(57) ABSTRACT

Methods, systems, and devices for wireless communications are described. A first user equipment (UE) in a wireless communications system, such as a vehicle-to-everything (V2X) communications systems, may communicate over sidelink to other UEs. The first UE may receive, from a base station, control signaling indicating a sidelink resource pool allocated for sidelink communication between the first UE and a second UE. The first UE may transmit an indication that superposition coding may be used to generate a concurrent sidelink and uplink transmission. The first UE may then transmit the concurrent sidelink and uplink transmission within a resource of the sidelink resource pool based on the indication. The second UE may decode the sidelink portion of the transmission, and the base station may decode the uplink portion of the transmission.

30 Claims, 15 Drawing Sheets

(51) Int. Cl.
    *H04W 72/14*    (2009.01)
    *H04W 28/26*    (2009.01)

(56) References Cited

U.S. PATENT DOCUMENTS

| | | | | |
|---|---|---|---|---|
| 2015/0156619 | A1* | 6/2015 | Fodor | H04W 8/005 |
| | | | | 455/434 |
| 2015/0326373 | A1* | 11/2015 | Ryu | H04L 5/0092 |
| | | | | 370/329 |
| 2016/0128064 | A1* | 5/2016 | Su | H04L 43/16 |
| | | | | 370/329 |
| 2016/0323892 | A1* | 11/2016 | Pradini | H04W 72/048 |
| 2019/0068274 | A1* | 2/2019 | Han | H04B 7/15528 |
| 2019/0068342 | A1* | 2/2019 | Kumar Parameswarn Rajamma | H04L 5/0048 |
| 2022/0103292 | A1* | 3/2022 | Hwang | H04L 1/1812 |
| 2022/0201617 | A1* | 6/2022 | Baek | H04W 74/08 |

* cited by examiner

SUPERPOSITION OF SIDELINK AND UPLINK TRANSMISSIONS

CROSS REFERENCE

The present Application for Patent claims the benefit of U.S. Provisional Patent Application No. 62/984,719 by BALASUBRAMANIAN et al., entitled "SUPERPOSITION OF SIDELINK AND UPLINK TRANSMISSIONS," filed Mar. 3, 2020, assigned to the assignee hereof, and expressly incorporated by reference in its entirety herein.

FIELD OF TECHNOLOGY

The following relates generally to wireless communications and more specifically to superposition of sidelink and uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station over an uplink communication channel in a first resource and may also communicate with neighboring UEs over a sidelink communications channel in a second resource that differs from the first resource. Conventional uplink and sidelink communication techniques are deficient.

SUMMARY

The described techniques relate to improved methods, systems, devices, and apparatuses that support superposition of sidelink and uplink transmissions. Generally, the described techniques provide for a first user equipment (UE) in a wireless communications system, such as a vehicle-to-everything (V2X) communications systems, may communicate over sidelink to other UEs, and over uplink to a base station. The first UE may receive, from a base station, control signaling indicating a sidelink resource pool allocated for sidelink communication between the first UE and a second UE. The first UE may transmit an indication that superposition coding may be used to or that indicates an intent to use superposition coding to generate a concurrent sidelink and uplink transmission. The first UE may then transmit the concurrent sidelink and uplink transmission within a resource of the sidelink resource pool based on the indication. The second UE may decode the sidelink portion of the transmission, and the base station may decode the uplink portion of the transmission.

A method of wireless communications by a first UE is described. The method may include receiving, from a base station, control signaling indicating a sidelink resource pool allocated for sidelink communication between the first UE and a second UE, transmitting an indication that indicates superposition coding is being used or that indicates an intent to use superposition coding to generate a concurrent sidelink and uplink transmission, and transmitting the concurrent sidelink and uplink transmission within a resource of the sidelink resource pool based on the indication.

An apparatus for wireless communications by a first UE is described. The apparatus may include a processor, memory coupled with the processor, and instructions stored in the memory. The instructions may be executable by the processor to cause the apparatus to receive, from a base station, control signaling indicating a sidelink resource pool allocated for sidelink communication between the first UE and a second UE, transmit an indication that indicates superposition coding is being used or that indicates an intent to use superposition coding to generate a concurrent sidelink and uplink transmission, and transmit the concurrent sidelink and uplink transmission within a resource of the sidelink resource pool based on the indication.

Another apparatus for wireless communications by a first UE is described. The apparatus may include means for receiving, from a base station, control signaling indicating a sidelink resource pool allocated for sidelink communication between the first UE and a second UE, transmitting an indication that indicates superposition coding is being used or that indicates an intent to use superposition coding to generate a concurrent sidelink and uplink transmission, and transmitting the concurrent sidelink and uplink transmission within a resource of the sidelink resource pool based on the indication.

A non-transitory computer-readable medium storing code for wireless communications by a first UE is described. The code may include instructions executable by a processor to receive, from a base station, control signaling indicating a sidelink resource pool allocated for sidelink communication between the first UE and a second UE, transmit an indication that indicates superposition coding is being used or that indicates an intent to use superposition coding to generate a concurrent sidelink and uplink transmission, and transmit the concurrent sidelink and uplink transmission within a resource of the sidelink resource pool based on the indication.

In some examples of the method, apparatuses, and non-transitory computer-readable medium described herein, transmitting the concurrent sidelink and uplink transmission may include operations, features, means, or instructions for transmitting the concurrent sidelink and uplink transmission based on a sidelink transmission encoded as a base layer of the concurrent sidelink and uplink transmission.

In some examples of the method, apparatuses, and non-transitory computer-readable medium described herein, transmitting the concurrent sidelink and uplink transmission may include operations, features, means, or instructions for transmitting the concurrent sidelink and uplink transmission based on an uplink transmission encoded as an enhancement layer of the concurrent sidelink and uplink transmission.

In some examples of the method, apparatuses, and non-transitory computer-readable medium described herein, transmitting the indication may include operations, features, means, or instructions for transmitting sidelink control information that includes the indication and indicates the resource of the sidelink resource pool.

In some examples of the method, apparatuses, and non-transitory computer-readable medium described herein, transmitting the indication may include operations, features, means, or instructions for transmitting sidelink control information that indicates the resource of the sidelink resource pool as at least one future time and frequency resource within the sidelink resource pool.

In some examples of the method, apparatuses, and non-transitory computer-readable medium described herein, transmitting the indication may include operations, features, means, or instructions for transmitting the indication that indicates at least one at least one future time and frequency resource within the sidelink resource pool to implicitly be an uplink reservation request.

In some examples of the method, apparatuses, and non-transitory computer-readable medium described herein, transmitting the indication may include operations, features, means, or instructions for transmitting sidelink control information that includes an uplink reservation request for the resource of the sidelink resource pool.

Some examples of the method, apparatuses, and non-transitory computer-readable medium described herein may further include operations, features, means, or instructions for receiving a grant for uplink transmission via the resource of the sidelink resource pool based on the uplink reservation request.

Some examples of the method, apparatuses, and non-transitory computer-readable medium described herein may further include operations, features, means, or instructions for transmitting control information indicating at least one transmission parameter for the concurrent sidelink and uplink transmission, where the concurrent sidelink and uplink transmission may be transmitted in accordance with the at least one transmission layer parameter.

In some examples of the method, apparatuses, and non-transitory computer-readable medium described herein, transmitting the control information may include operations, features, means, or instructions for transmitting the control information indicating the at least one transmission parameter that may be a power split parameter between an uplink transmission of the concurrent sidelink and uplink transmission and a sidelink transmission of the concurrent sidelink and uplink transmission.

In some examples of the method, apparatuses, and non-transitory computer-readable medium described herein, transmitting the control information may include operations, features, means, or instructions for transmitting the control information indicating the at least one transmission parameter that may be a first modulation and coding scheme parameter for an uplink transmission of the concurrent sidelink and uplink transmission and a second modulation and coding scheme parameter for a sidelink transmission of the concurrent sidelink and uplink transmission.

Some examples of the method, apparatuses, and non-transitory computer-readable medium described herein may further include operations, features, means, or instructions for receiving a reference signal from the base station, where the indication may be transmitted based on a measurement of the reference signal.

Some examples of the method, apparatuses, and non-transitory computer-readable medium described herein may further include operations, features, means, or instructions for determining a sidelink path quality metric and an uplink path quality metric, where the indication may be transmitted based on the sidelink path quality metric and the uplink path quality metric.

Some examples of the method, apparatuses, and non-transitory computer-readable medium described herein may further include operations, features, means, or instructions for receiving a control message from the base station indicating a capability of the base station to support superposition coding, and transmitting the indication that indicates superposition coding is being used or that indicates the intent to use superposition coding to generate the concurrent sidelink and uplink transmission based on the control message.

A method of wireless communications by a base station is described. The method may include transmitting, to a first UE, control signaling indicating a sidelink resource pool allocated for sidelink communication between the first UE and a second UE, receiving an indication that indicates superposition coding is being used or that indicates an intent to use superposition coding to generate a concurrent sidelink and uplink transmission, and receiving the concurrent sidelink and uplink transmission within a resource of the sidelink resource pool based on the indication.

An apparatus for wireless communications by a base station is described. The apparatus may include a processor, memory coupled with the processor, and instructions stored in the memory. The instructions may be executable by the processor to cause the apparatus to transmit, to a first UE, control signaling indicating a sidelink resource pool allocated for sidelink communication between the first UE and a second UE, receive an indication that indicates superposition coding is being used or that indicates an intent to use superposition coding to generate a concurrent sidelink and uplink transmission, and receive the concurrent sidelink and uplink transmission within a resource of the sidelink resource pool based on the indication.

Another apparatus for wireless communications by a base station is described. The apparatus may include means for transmitting, to a first UE, control signaling indicating a sidelink resource pool allocated for sidelink communication between the first UE and a second UE, receiving an indication that indicates superposition coding is being used or that indicates an intent to use superposition coding to generate a concurrent sidelink and uplink transmission, and receiving the concurrent sidelink and uplink transmission within a resource of the sidelink resource pool based on the indication.

A non-transitory computer-readable medium storing code for wireless communications by a base station is described. The code may include instructions executable by a processor to transmit, to a first UE, control signaling indicating a sidelink resource pool allocated for sidelink communication between the first UE and a second UE, receive an indication that indicates superposition coding is being used or that indicates an intent to use superposition coding to generate a concurrent sidelink and uplink transmission, and receive the concurrent sidelink and uplink transmission within a resource of the sidelink resource pool based on the indication.

In some examples of the method, apparatuses, and non-transitory computer-readable medium described herein, receiving the concurrent sidelink and uplink transmission may include operations, features, means, or instructions for receiving the concurrent sidelink and uplink transmission based on a sidelink transmission encoded as a base layer of the concurrent sidelink and uplink transmission.

In some examples of the method, apparatuses, and non-transitory computer-readable medium described herein, receiving the concurrent sidelink and uplink transmission may include operations, features, means, or instructions for receiving the concurrent sidelink and uplink transmission based on an uplink transmission encoded as an enhancement layer of the concurrent sidelink and uplink transmission.

In some examples of the method, apparatuses, and non-transitory computer-readable medium described herein, receiving the indication may include operations, features, means, or instructions for receiving sidelink control information that includes the indication and indicates the resource of the sidelink resource pool.

In some examples of the method, apparatuses, and non-transitory computer-readable medium described herein, receiving the indication may include operations, features, means, or instructions for receiving sidelink control information that indicates the resource of the sidelink resource pool as at least one future time and frequency resource within the sidelink resource pool.

In some examples of the method, apparatuses, and non-transitory computer-readable medium described herein, receiving the indication may include operations, features, means, or instructions for receiving the indication that indicates at least one at least one future time and frequency resource within the sidelink resource pool to implicitly be an uplink reservation request.

In some examples of the method, apparatuses, and non-transitory computer-readable medium described herein, receiving the indication may include operations, features, means, or instructions for receiving sidelink control information that includes an uplink reservation request for the resource of the sidelink resource pool.

Some examples of the method, apparatuses, and non-transitory computer-readable medium described herein may further include operations, features, means, or instructions for transmitting a grant for uplink transmission via the resource of the sidelink resource pool based on the uplink reservation request.

Some examples of the method, apparatuses, and non-transitory computer-readable medium described herein may further include operations, features, means, or instructions for receiving control information indicating at least one transmission parameter for the concurrent sidelink and uplink transmission, where the concurrent sidelink and uplink transmission may be received in accordance with the at least one transmission layer parameter.

In some examples of the method, apparatuses, and non-transitory computer-readable medium described herein, receiving the control information may include operations, features, means, or instructions for performing, based on the control information, base layer cancellation from the concurrent sidelink and uplink transmission to obtain an enhancement layer of the concurrent sidelink and uplink transmission.

In some examples of the method, apparatuses, and non-transitory computer-readable medium described herein, receiving the control information may include operations, features, means, or instructions for receiving the control information indicating the at least one transmission parameter that may be a power split parameter between an uplink transmission of the concurrent sidelink and uplink transmission and a sidelink transmission of the concurrent sidelink and uplink transmission.

In some examples of the method, apparatuses, and non-transitory computer-readable medium described herein, receiving the control information may include operations, features, means, or instructions for receiving the control information indicating the at least one transmission parameter that may be a first modulation and coding scheme parameter for an uplink transmission of the concurrent sidelink and uplink transmission and a second modulation and coding scheme parameter for a sidelink transmission of the concurrent sidelink and uplink transmission.

Some examples of the method, apparatuses, and non-transitory computer-readable medium described herein may further include operations, features, means, or instructions for transmitting a reference signal, where the indication may be received based on a measurement of the reference signal.

Some examples of the method, apparatuses, and non-transitory computer-readable medium described herein may further include operations, features, means, or instructions for transmitting a control message to the UE indicating a capability of the base station to support superposition coding, and receiving the indication that indicates superposition coding is being used or that indicates the intent to use superposition coding to generate the concurrent sidelink and uplink transmission based on the control message.

DETAILED DESCRIPTION

Figure 1:
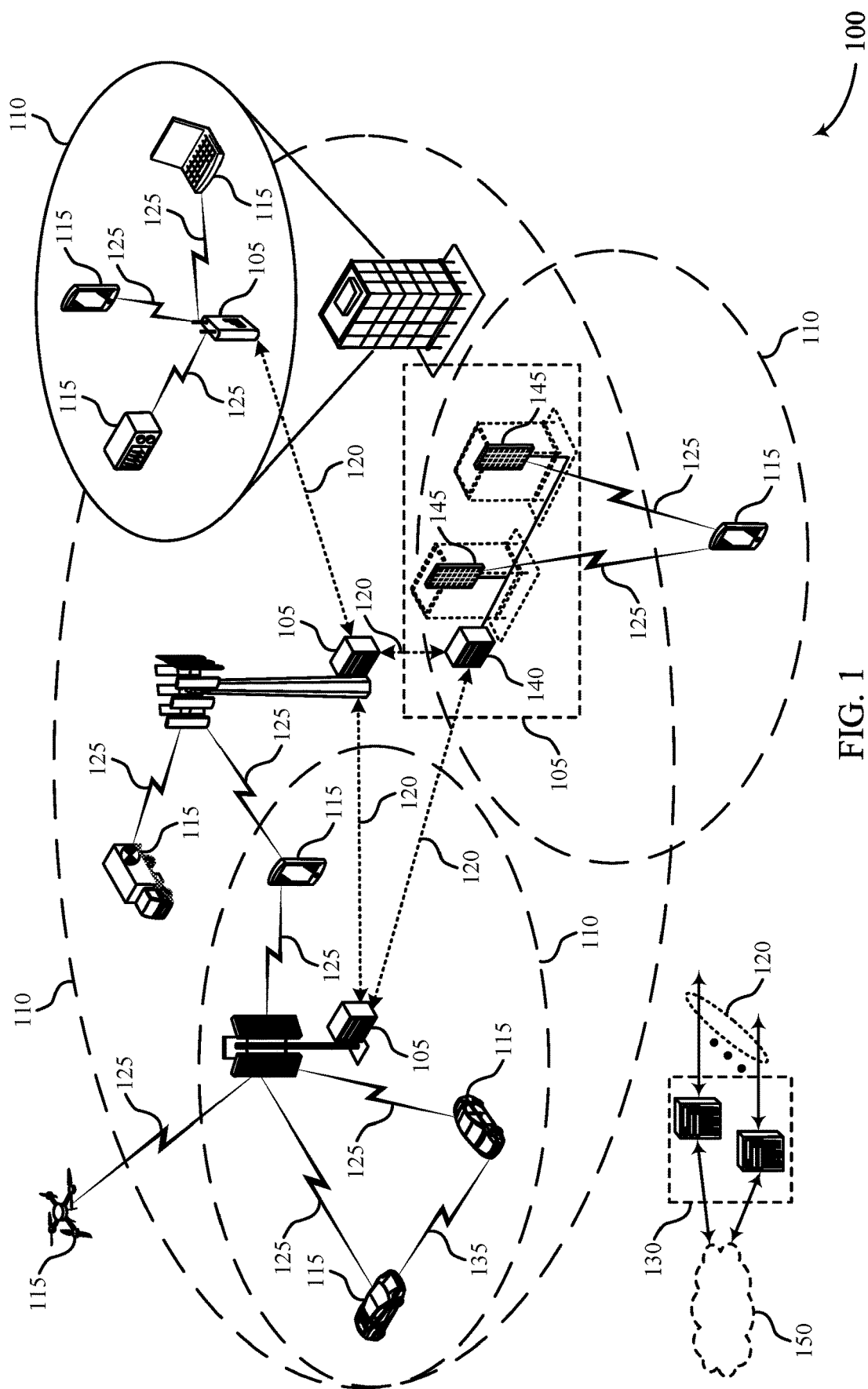
FIG. 1 illustrates an example of a wireless communications system in accordance with aspects of the present disclosure.

A user equipment (UE) may communicate with a base station over uplink channels and may also communicate with neighboring UEs over a sidelink communications channel. A UE communicating over a sidelink channel to other neighboring UEs may be, in an example, a vehicle in a vehicle to vehicle (V2V) or a vehicle to everything (V2X) wireless communication system. In some cases, separate resources may be assigned for sidelink transmissions and for uplink transmissions, such as in conventional Mode-1 or Mode-2 V2X systems.

In order to efficiently utilize available time and frequency resources, a UE may transmit sidelink communications in a base layer, and the UE may also transmit uplink communications in an enhancement layer. For example, a UE may encode data to be transmitted in a sidelink channel (e.g., a physical sidelink shared channel (PSSCH)) as the base layer, and encoding data to be transmitted in a physical uplink shared channel (PUSCH) as enhancement layer. The base layer and the enhancement layer may be superimposed in a concurrent transmission such that the UE may transmit the base layer and the enhancement layer simultaneously. The base layer in a superposition transmission may be encoded based on a weaker communication link (e.g., based on a channel with a lower signal to noise ratio (SNR)), and the enhancement layer may be encoded based on a stronger communication link (e.g., based on the channel with a higher SNR). Thus, the UE may transmit a concurrent transmission within a same resource that includes the base layer and the enhancement layer, which may lead to a higher spectral efficiency.

A UE simultaneously transmitting the concurrent sidelink and uplink communications (e.g., concurrent sidelink and uplink or Uu transmission) may indicate that a concurrent sidelink and uplink transmission is being transmitted via a resource of a resource pool allocated for sidelink communication. Because the UE indicates to the base station that a concurrent sidelink and uplink transmission is being transmitted, the base station may monitor this indicated resource for the concurrent sidelink and uplink transmission.

The UE may also provide the base station with one or more transmission parameters that may be used by the UE to generate the concurrent sidelink and uplink transmission. Thus, the base station may use the parameters to cancel the base layer from the concurrent sidelink and uplink transmission, such that the base station may decode the enhancement layer of the concurrent sidelink and uplink transmission. The parameters may include an indication of a modulation and coding scheme (MCS) used to generate the sidelink transmission of the concurrent sidelink and uplink transmission, the MCS used to generate the uplink transmission of the concurrent sidelink and uplink transmission, a power split parameter indicating a power split between the sidelink and uplink transmissions of the concurrent sidelink and uplink transmission, and an indication that the channel is coded for the multi-user superposition transmission (MUST), or any combination thereof.

In some cases, the UE may transmit, to the base station, a reservation request to schedule an upcoming concurrent sidelink and uplink transmission. In this case, the UE may transmit only sidelink data (e.g., data not intended for the base station) along with an indication of future reservation instances (e.g., in time and frequency). Based on receiving this indication, which may be transmitted in sidelink control information as part of a sidelink message to another UE, the base station may provide a grant for the UE to transmit a MUST message (e.g., the concurrent sidelink and uplink transmission) during one or the upcoming future reservation instances. Based on receiving the grant, the UE may then encode the data to be transmitted concurrently, and may transmit the concurrent base layer and enhancement layers over the sidelink and uplink channels.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to superposition of sidelink and uplink transmissions.

FIG. 1 illustrates an example of a wireless communications system 100 that supports superposition of sidelink and uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first user equipment UE 115 in wireless communications system 100, such as in a V2X communications systems, may communicate over sidelink to other UEs 115, and over uplink to a base station 105. The first UE 115 may receive, from a base station 105, control signaling indicating a sidelink resource pool allocated for sidelink communication between the first UE 115 and a second UE 115. The first UE 115 may transmit an indication that superposition coding may be used to generate a concurrent sidelink and uplink transmission. The first UE 115 may then transmit the concurrent sidelink and uplink transmission within a resource of the sidelink resource pool based on the indication. The second UE 115 may decode the sidelink portion of the transmission, and the base station 105 may decode the uplink portion of the transmission.

Figure 2:
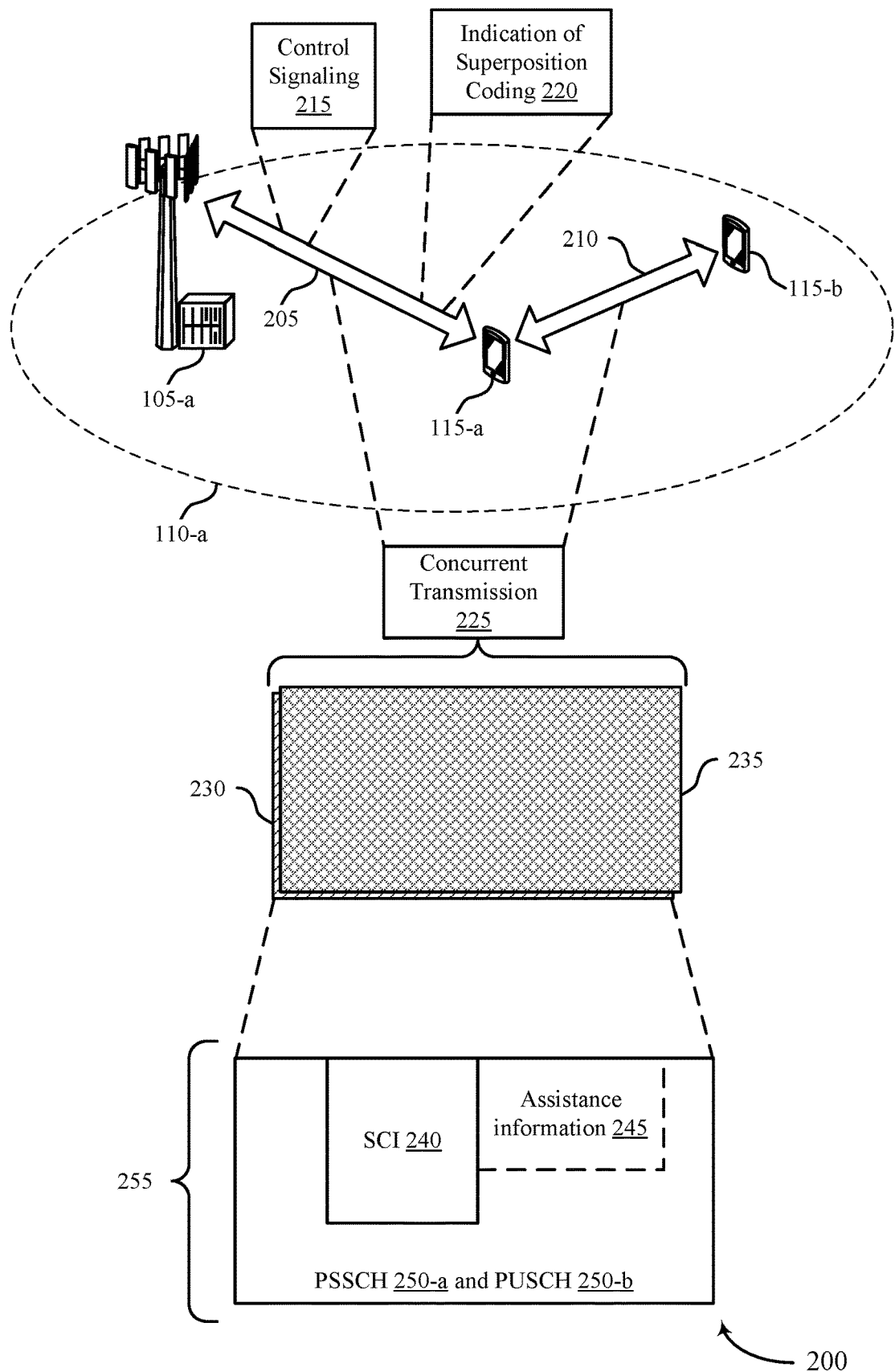
FIG. 2 illustrates an example of a wireless communications system in accordance with aspects of the present disclosure.

FIG. 2 illustrates an example of a wireless communications system 200 that supports superposition of sidelink and uplink transmissions in accordance with aspects of the present disclosure. In some examples, wireless communications system 200 may implement aspects of wireless communication system 100. UE 115-a and UE 115-b may be examples of UEs 115 as described with reference to FIG. 1. Base station 105-a may be an example of a base station 105 as described with reference to FIG. 1. UE 115-a may communicate with base station 105-b by receiving and transmitting signaling over communication channel 205. UE 115-a may communicate with UE 115-b by receiving and transmitting signaling over sidelink channel 210. UEs 115 may be example of vehicles in a V2V or V2X wireless communications system.

UE 115-a may periodically measure channel quality parameters of communication channel 205 and sidelink channel 210. UE 115-a may measure the SNR of both channel 205 and 210, and may determine that sidelink channel 210 has a lower SNR, or another channel quality measurement. This may lead to a case of SNR mismatch in cases where channel 205 has a relatively higher SNR than the sidelink channel 210. UE 115-a may utilize the SNR mismatch between the uplink channel 205 and the sidelink channel 210 to transmit a concurrent sidelink and uplink transmission within a resource shared by the sidelink channel 210 and the uplink channel 205 to obtain higher spectral efficiency.

UE 115-a may perform a path loss measurement (e.g., an average path loss measurement) experienced in the sidelink channel 210 over a particular time window $T_W$. UE 115-a may perform this measurement by determining the reference signal receive power (RSRP) of sidelink channel 210, and also by receiving sidelink control information (SCI) and decoding SCI over the sidelink channel 210 from nearby UEs, such as from UE 115-b. In some cases, UE 115-b may use a conventional path loss measurement. The conventional path loss measurement may be based on uplink reference signals that base station 105-a may transmit to UE 115-a. The reference signals may include CSI-RS, a demodulation reference signal (DMRS), or another type of reference signal.

In other cases, base station 105-a may transmit several narrowband signals across different time-frequency sidelink resource pools. UE 115-a may then be able to granularly determine uplink path loss, as UE 115-a may be able to determine path loss on a per resource pool basis, or path loss within different resources within a resource pool.

Based on the determined sidelink and uplink path loss, UE 115-a may determine whether path loss conditions may be suitable for performing a concurrent sidelink and uplink transmission. For example, UE 115-a may determine whether the sidelink path loss, the uplink path loss, or both, satisfy a path loss threshold. Then UE 115-a may determine whether to transmit concurrent transmission 225.

UE 115-a may be allocated a resource pool by base station 105-a. The resource pool may be a sidelink resource pool, and base station 105-a may not control or schedule the resources in the pool. Thus, in cases where UE 115-a determines to transmit concurrent transmission 225, UE 115-a may autonomously choose a resource in an available sidelink pool for transmission of a concurrent transmission 225, without receiving specific scheduling information from base station 105-a or performing a random access process. For example, in Mode-2 V2X systems, a UE 115-a may autonomously choose resources and transmission parameters within a resource pool allocated by base station 105-a, and the base station 105-a does not control (e.g., schedule) resources in the resource pool. Further, base station 105-a may not be expected to decode the resource pool allocated for sidelink transmissions, as the sidelink transmissions may be in sidelink channel 210 between one or more UEs 115, and may not contain data for base station 105-a.

UE 115-a may encode data to be transmitted as sidelink transmission in base layer 230, and also encode data to be transmitted to base station 105—in the enhancement layer 235. Moreover, in conventional techniques, the base station 105-a may not be aware a resource scheduled by UE 115-a within the allocated resource pool and communication parameters used by UE 115-a for transmission within the resource (e.g., MCS used for a scheduled transmission).

In some cases, UE 115-a may initially transmit sidelink data without uplink data. The initial transmission of the sidelink data may be transmitted in PSSCH 250-a, and may include information blocks 255. UE 115-a may transmit SCI 240 before or along with the sidelink data transmission in PSSCH 250-a. In this case, UE 115-a may include, in SCI 240, an indication of future reservation instances $\{(t_1, f_1), (t_2, f_2)\}$ for future sidelink data transmissions in PSSCH 250-a. The future reservations of future sidelink data transmissions may therefore also be used for uplink data transmissions when UE 115-a transmits sidelink and uplink data concurrently. ($t_i$, $f_i$) may denote the time frequency resources at a future time i, along with a set of preferences to perform superposition transmission.

Base station 105-*a* may not be aware of when UE 115-*a* is performing the sidelink data transmission in PSSCH 250-*a* along with the SCI 240. However, base station 105-*a* may monitor for or receive the future reservations from UE 115-*a* based on receiving the SCI 240. UE 115-*a* may also provide additional intention of performing the concurrent transmission in the SCI 240. Base station 105-*a* may then be aware of future concurrent transmission reservations.

Base station 105-*a* may receive the SCI 240 from UE 115-*a*, and base station 105-*a* may decode the SCI 240. Base station 105-*a* may then infer from the future reservation instances ($t_i$, $f_i$) indicated in SCI 240 where UE 115-*a* may transmit further concurrent transmissions 225 on time and frequency resources ($t_i$, $f_i$).

In cases where UE 115-*a* notifies base station 105-*a* of future concurrent transmissions through transmission of the SCI 240, base station 105-*a* may transmit a grant (e.g., an acknowledgment) for UE 115-*a* to transmit a concurrent transmission 225. The grant may be transmitted such that the concurrent transmission 225 is scheduled during one or more of instances ($t_i$, $f_i$). The grant may be transmitted by base station 105-*a* in channel 205 to UE 115-*a*.

In some cases, base station 105-*a* may transmit, to UE 115-*a*, a capability of base station 105-*a* to support superposition coding. Base station 105-*a* may transmit the capability in a control message, such as in control signaling 215. The capability may be applicable for a particular TTI or time window. In some cases, UE 115-*a* may transmit the indication that indicates superposition coding is being used or that indicates an intent to use superposition coding to generate a concurrent sidelink and uplink transmission based on receiving the capability of base station 105-*a*.

For the one or more reservation time instances ($t_i$, $f_i$) for which UE 115-*a* has received a grant, UE 115-*a* may apply superposition coding to encode sidelink data as a base layer 230 of concurrent transmission 225, and UE 115-*a* may encode the uplink data as an enhancement layer 235 of concurrent transmission 225. UE 115-*a* may encode the sidelink data in base layer 230 using power $\beta P$ for encoding base layer 230 and power $(1-\beta)P$ for encoding the uplink enhancement layer 235 of concurrent transmission 225. UE 115-*a* may transmit concurrent transmission 225 that includes base layer 230 and enhancement layer 235 in the same resources, and concurrent transmission 225 may be received by base station 105-*a* in channel 205 and may also be received by UE 115-*b* in sidelink channel 210. Enhancement layer 235 may thus include PUSCH 250-*b*.

UE 115-*a* may also include SCI 240 for sidelink UEs 115 to be able to decode the PSSCH 250-*a*. UE 115-*a* may also transmit control information that is depicted as assistance information 245 for base station 105-*a* to be able to decode the enhancement layer 235. The assistance information 245 may include the MCS of the enhancement layer 235 and the power split factor of the power split between the uplink transmission in PUSCH 250-*b* in enhancement layer 235, and the sidelink transmission in PSSCH 250-*a* in base layer 230. UE 115-*a* may transmit this assistance information 245 to base station 105-*a*.

In some cases, UE 115-*a* may transmit separate assistance information 245 for sidelink data in base layer 230 and uplink data in enhancement layer 235. This is illustrated in FIG. 2, where SCI 240 (including information and parameters for decoding PSSCH 250-*a* encoded in base layer 230) is separate from assistance information 245 (including information and parameters for decoding PUSCH 250-*b* encoded in enhancement layer 235). In other cases, a SCI format may be used that includes the assistance information 245 (e.g., the MCS of the base layer, and the MCS of the enhancement layer, and the power split $\beta$). In this case, assistance information 245 may be included in SCI 240.

In some cases, base station 105-*a* may provide transmission parameters (e.g., MCS) for the enhancement layer 235 (e.g., data for transmission to base station 105-*a*). The transmission parameters for encoding the uplink data in PUSCH 250-*b* in enhancement layer 235 may be indicated by base station 105-*a* to UE 115-*a* in control signaling. In this case, UE 115-*a* may then not transmit assistance information 245 for decoding enhancement layer 235, as the enhancement layer 235 may be encoded based on the transmission parameters previously received from base station 105-*a*. Thus, base station 105-*a* may be aware of the parameters, and may use those parameters to decode the enhancement layer 235 of concurrent transmission 225.

The parameters may indicate a power split $\beta$ between the sidelink transmission and the uplink transmission. For example, the power split $\beta$ may indicate power levels used for each of the sidelink transmission in base layer 230 and the uplink transmission in enhancement layer 235. The power split $\beta$ may be defined such that the power split between the sidelink channel and the uplink channel is $0 \leq \beta \leq 1$. The parameters may indicate open loop control parameters (e.g., $P_o$, alpha) for concurrent sidelink and uplink transmission. For example, the open loop power control parameters may include a $P_o$ value and an alpha value.

UE 115-*a* may transmit concurrent transmission 225. Base layer 230 may include sidelink information or data and enhancement layer 235 may include uplink information or data. Base layer 230 and enhancement layer 235 may be allocated the same resources. Base layer 230 may include lower quality or lower fidelity data than enhancement layer 235, and enhancement layer may include data encoded with scaled coding, such that enhancement layer 235 and base layer 230 may be decoded when transmitted in a high quality channel, and base layer 230 may be decoded and the enhancement layer may not be received due to being transmitted in a lower quality channel (e.g., based on the SNR of the channel).

UE 115-*b*, and other UEs 115 that receive the concurrent transmission 225 over a sidelink channel (e.g., sidelink channel 210) may decode the data in base layer 230. UE 115-*b* may perform decoding of SCI 240 in order to decode base layer 230 sidelink data in PSSCH 250-*a* of concurrent transmission 225. UE 115-*b* may be agnostic to the presence of enhancement layer 235, may treat enhancement layer 235 of concurrent transmission 225 as noise, or both. UE 115-*b* may therefore also disregard any control information (e.g., assistance information 245 within SCI 240 or separate from SCI 24) that may indicate decoding information for enhancement layer 235.

Base station 105-*a* may decode the SCI 240 or assistance information 245, or both, to obtain the decoding information about base layer 230. Base station 105-*a* may utilize those parameters to cancel the base layer 230 from a concurrent transmission 225, in order to decode enhancement layer 235. Base station 105-*a* may use the enhancement layer assistance information 245 to decode the uplink data in enhancement layer 235.

In other cases, rather than UE 115-*a* initially transmitting sidelink data with future concurrent transmission reservations, UE 115-*a* may encode the sidelink data as base layer 230 data using a first power βP for encoding base layer 230 and power (1−β)P for encoding the uplink enhancement layer 235. Then, rather than receiving a grant from base station 105-a for the concurrent transmission 225, UE 115-a may transmit concurrent transmission 225 with base layer 230 and enhancement layer 235. UE 115-a may transmit SCI 240 that includes information of whether or not the current subchannel is MUST encoded or not. Base station 105-a may use the information of whether or not the subchannel is MUST encoded to decode enhancement layer 235.

Figure 3:
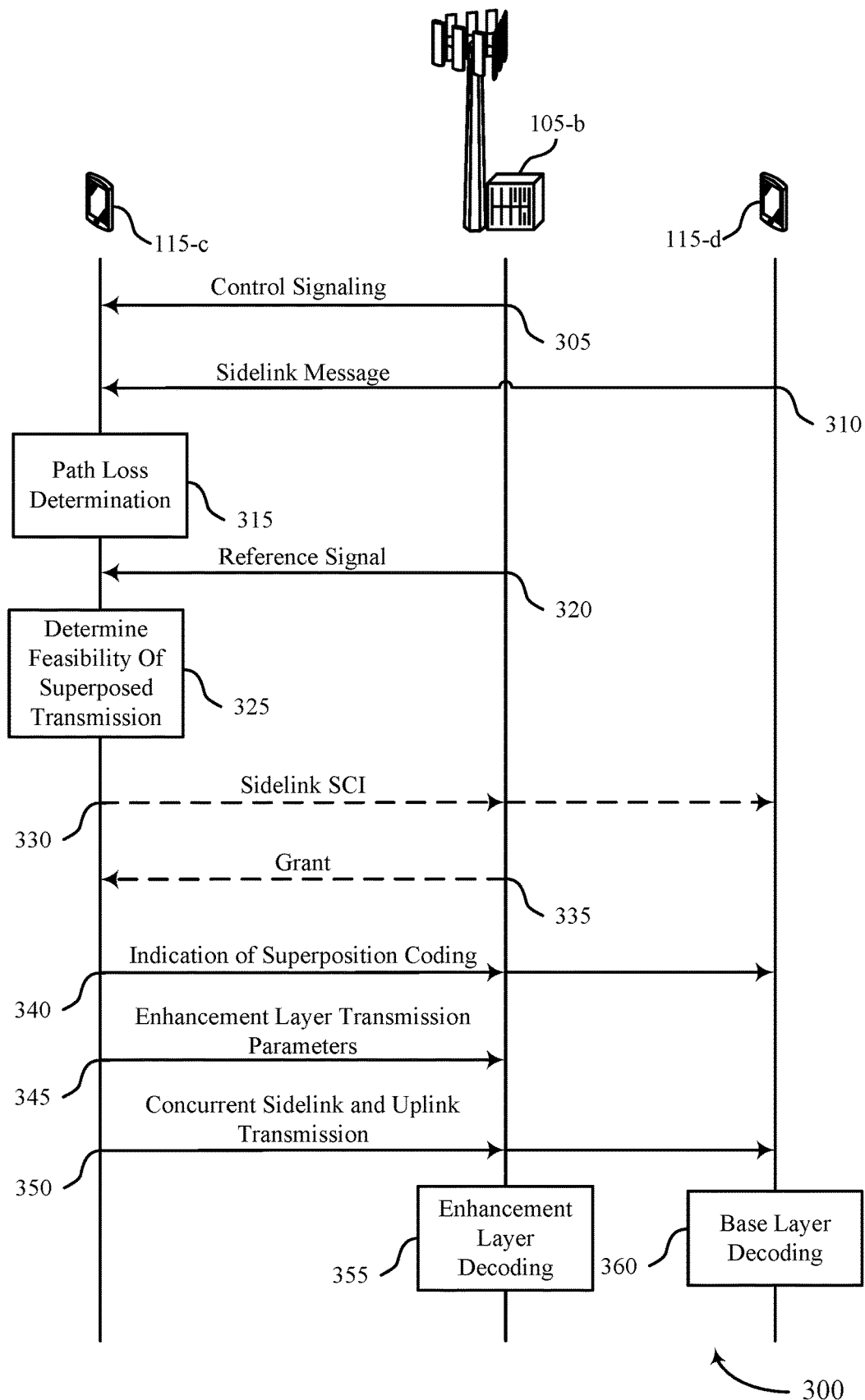
FIG. 3 illustrates an example of a process flow in accordance with aspects of the present disclosure.

FIG. 3 illustrates an example of a process flow 300 that supports superposition of sidelink and uplink transmissions in accordance with aspects of the present disclosure. In some examples, process flow 300 may implement aspects of wireless communication systems 100 and 200. UEs 115-c and 115-d may be examples of a UE 115 as described with reference to FIGS. 1 and 2. Base station 105-b may be an example of a base station 105 as described with reference to FIGS. 1 and 2. UEs 115 may be examples of vehicles, such as in a V2V or V2X wireless communications system.

At 305, UE 115-c may receive, from base station 105-b, control signaling indicating a sidelink resource pool allocated for sidelink communication between UE 115-c and UE 115-d. At 310, UE 115-c may receive a sidelink message from another UE 115-d that may be used for a sidelink path loss determination.

At 315, UE 115-c may determine a sidelink path quality metric. The sidelink path quality metric may be determined by UE 115-c performing a path loss measurement (e.g., an average path loss measurement) experienced in the sidelink channel in which the sidelink message 310 is received, in accordance with the sidelink path loss determination techniques described herein. For example, the path loss measurement may be performed over a particular time window $T_W$. UE 115-c may perform this measurement by determining a sidelink path quality metric (e.g., the RSRP of the sidelink channel), and also based on receiving a SCI and decoding the SCI over the sidelink channel from nearby UEs 115, such as from UE 115-d.

At 320, UE 115-c may receive a reference signal (e.g., a CSI-RS, a DMRS, or other reference signal) from base station 105-b for determining an uplink path quality metric. In some cases, UE 115-c may perform an uplink path loss measurement to determine an uplink path quality metric (e.g., RSRP) of the uplink channel. The uplink path loss measurement may be based on uplink reference signals that base station 105-b transmits to UE 115-b at 320. The reference signals may include CSI-RS, DMRS, or another type of reference signal.

At 325, UE 115-c may determine whether concurrent sidelink and uplink transmission is feasible. This determination may be based on the sidelink path loss metric at 315 and the uplink path loss metric at 320. The indication of superposition coding transmitted at 330 or 340 may be based on the sidelink and uplink path loss metrics. For example, based on the sidelink path loss metric and the uplink path loss metric, UE 115-c may determine a feasibility of superposed transmission. In an example, the UE 115-c may determine, based on the sidelink path loss metric and the uplink path loss metric, that a SNR mismatch exists between the sidelink channel to UE 115-d and the uplink channel to base station 105-b. Based on this SNR mismatch, UE 115-a may determine that the transmission conditions are suited for a concurrent sidelink and uplink transmission over a shared resource of the resource pool for communicating both the sidelink channel and the uplink channel.

In some cases, at 330, UE 115-c may transmit an indication that superposition coding is being used to generate concurrent sidelink and uplink transmission. For example, the UE 115-c may transmit SCI that includes an indication that superposition coding is being used and may indicate the resource of the sidelink resource pool that UE 115-c has selected for a concurrent sidelink and uplink transmission. UE 115-c may transmit SCI that indicates one or more future reservation instances for one or more concurrent sidelink and uplink transmissions, where the SCI may be decoded by base station 105-b to determine the future reservation instances within the resource pool in which the UE 115-c intends to perform superposition transmission (e.g., concurrent sidelink and uplink transmission). In some examples, the future reservation instances may implicitly indicate an uplink reservation request to the base station 105-b to be instances of a concurrent sidelink and uplink transmission (e.g., a MUST transmission). UE 115-c may transmit SCI that indicates the resource of the sidelink resource pool as at least one future time and frequency resource within the sidelink resource pool. In some examples, UE 115-c may transmit SCI that includes an uplink reservation request for the resource of the sidelink resource pool (e.g., an explicit reservation request) in which to transmit one or more concurrent sidelink and uplink transmissions. Thus, base station 105-b may implicitly or explicitly be aware of when UE 115-b may transmit a future concurrent sidelink and uplink transmission.

In some cases, at 335, base station 105-b may transmit, in response to the sidelink SCI, a grant for uplink transmission for UE 115-c to use a future reservation instance for the transmission of the concurrent sidelink and uplink transmission (e.g., for a MUST). The grant for uplink transmission may be transmitted via a physical downlink control channel (PDCCH) by base station 105-b. The grant may indicate the resource of the at least one future time and frequency resource within the sidelink resource pool previously indicated by the UE 115-c in SCI for the one or more the concurrent sidelink and uplink transmissions. UE 115-c may receive the grant for uplink transmission via the resource of the sidelink resource pool based on the uplink reservation request.

In some cases, instead or in addition to UE 115-c transmitting SCI indicating one or more future reservations at 330, UE 115-c may instead transmit, at 340, an indication of an intent to perform superposition coding for concurrent sidelink and uplink transmissions. Subsequent to transmitting the indication of the intent at 340, UE 115-a may encode the sidelink data as base layer data using a first power βP for encoding base layer and power (1−β)P for encoding the uplink enhancement layer. Then, rather than receiving a grant at 335 from base station 105-b for the concurrent transmission, UE 115-a may transmit concurrent sidelink and uplink transmission at 350 with sidelink data in the base layer and uplink data in the enhancement layer. UE 115-c may include transmission of SCI that includes information of whether or not the current subchannel is MUST encoded. Base station 105-b may use the information of whether or not the subchannel is MUST encoded to decode enhancement layer.

In some cases, base station 105-b may also transmit (e.g., in control signaling 305), to UE 115-c, a capability of base station 105-b to support superposition coding. The capability may be applicable for a particular TTI or time window. In some cases, UE 115-c may transmit the indication that indicates superposition coding is being used or that indicates an intent to use superposition coding to generate a concurrent sidelink and uplink transmission based on receiving the capability of base station 105-*b*.

In either case of whether UE 115-*c* transmits a separate sidelink SCI transmission at 330 or instead transmits an indication of an intent to transmit using superposition code (e.g., without transmitting SCI indicating one or more future reservations) at 330, UE 115-*c* may transmit enhancement layer transmission parameters at 345. In some cases, the UE 115-*c* may transmit SCI that includes the enhancement layer transmission parameters. For example, UE 115-*c* may transmit control information indicating at least one transmission parameter for the concurrent sidelink and uplink transmission, where the concurrent sidelink and uplink transmission may be transmitted in accordance with the at least one transmission layer parameter. UE 115-*c* may transmit the control information indicating the at least one transmission parameter that is a power split parameter (e.g., β) between an uplink transmission of the concurrent sidelink and uplink transmission, and a sidelink transmission of the concurrent sidelink and uplink transmission. UE 115-*c* may transmit the control information indicating the at least one transmission parameter that may be a first MCS parameter for an uplink transmission of the concurrent sidelink and uplink transmission, and a second MCS parameters for a sidelink transmission of the concurrent sidelink and uplink transmission.

At 350, UE 115-*c* may transmit a concurrent sidelink and uplink transmission within a resource of the sidelink resource pool based on the indication. The concurrent sidelink and uplink transmission may be transmitted to base station 105-*b* and UE 115-*d*, as well as other UEs 115. UE 115-*c* may transmit the concurrent sidelink and uplink transmission based on a sidelink transmission encoded as a base layer of the concurrent sidelink and uplink transmission. UE 115-*c* may transmit the concurrent sidelink and uplink transmission based on an uplink transmission encoded as an enhancement layer of the concurrent sidelink and uplink transmission.

Base station 105-*b* may receive the concurrent sidelink and uplink transmission within a resource of the sidelink resource pool, based on receiving the indication of superposition coding at 340. At 355, base station 105-*b* may perform, based on the control information including enhancement layer transmission parameters received at 345, base layer cancellation from the concurrent sidelink and uplink transmission to obtain an enhancement layer of the concurrent sidelink and uplink transmission.

At 360, UE 115-*d* may decode the base layer of the concurrent sidelink and uplink transmission transmitted at 350. UE 115-*d* and other UEs 115 that receive the concurrent sidelink and uplink transmission over a sidelink channel may decode the base layer based on disregarding any control information for the enhancement layer of the concurrent transmission.

Figure 4:
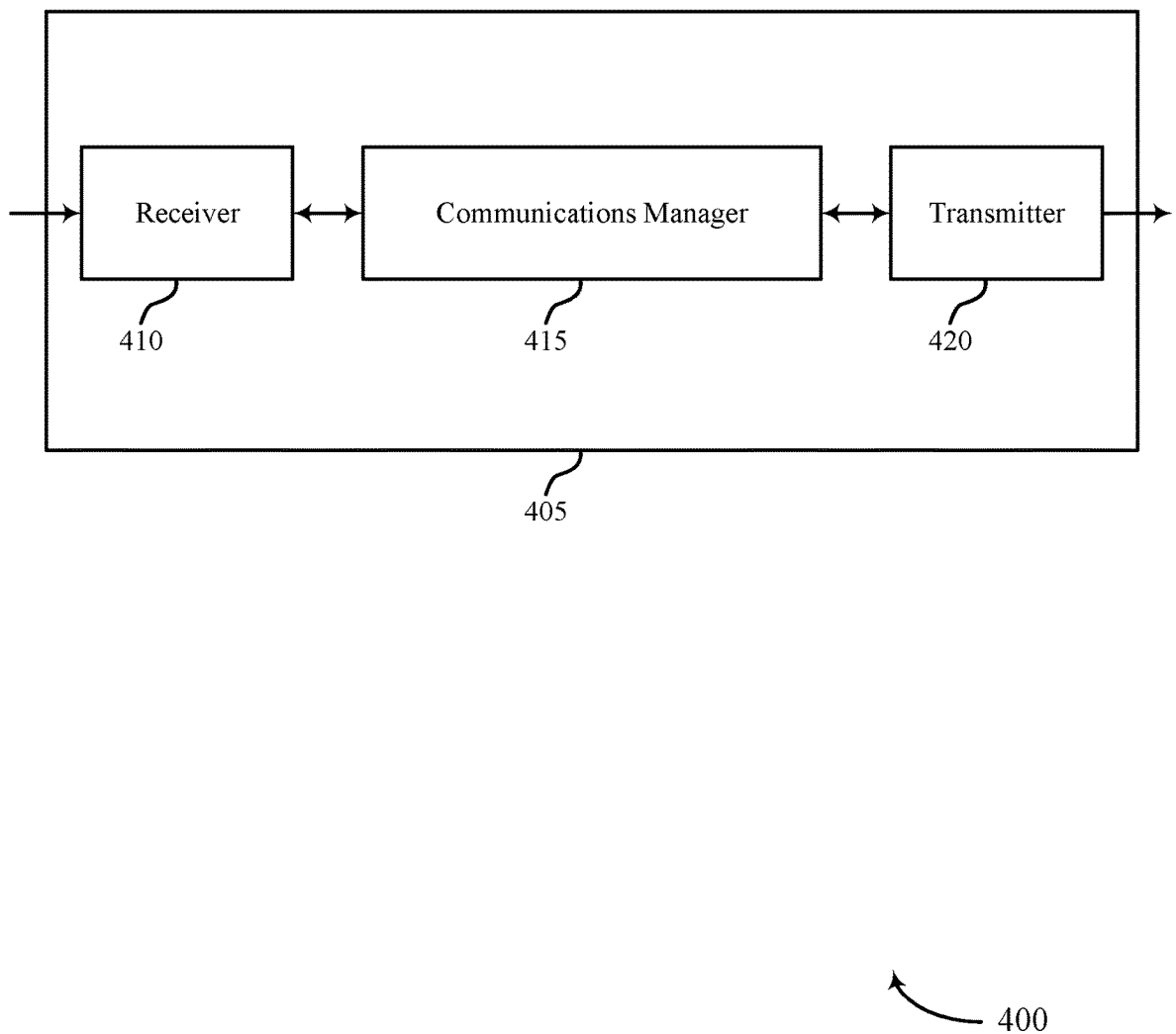
FIGS. 4 and 5 show block diagrams of devices in accordance with aspects of the present disclosure.

FIG. 4 shows a block diagram 400 of a device 405 that supports superposition of sidelink and uplink transmissions in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to superposition of sidelink and uplink transmissions, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, control signaling indicating a sidelink resource pool allocated for sidelink communication between the first UE and a second UE, transmit an indication that indicates superposition coding is being used or that indicates an intent to use superposition coding to generate a concurrent sidelink and uplink transmission, and transmit the concurrent sidelink and uplink transmission within a resource of the sidelink resource pool based on the indication. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by communications manager 415 as described herein may be implemented to realize one or more potential advantages. One implementation may allow a UE 115 to save power and increase battery life by increasing the efficient use of resources and improving throughput. Additionally, the UE 115 may further reduce retransmissions by efficiently allocating sidelink and uplink transmissions based on measurements of channel quality, and efficiently scheduling transmissions by communicating with a base station 105 about upcoming transmissions.

Figure 5:
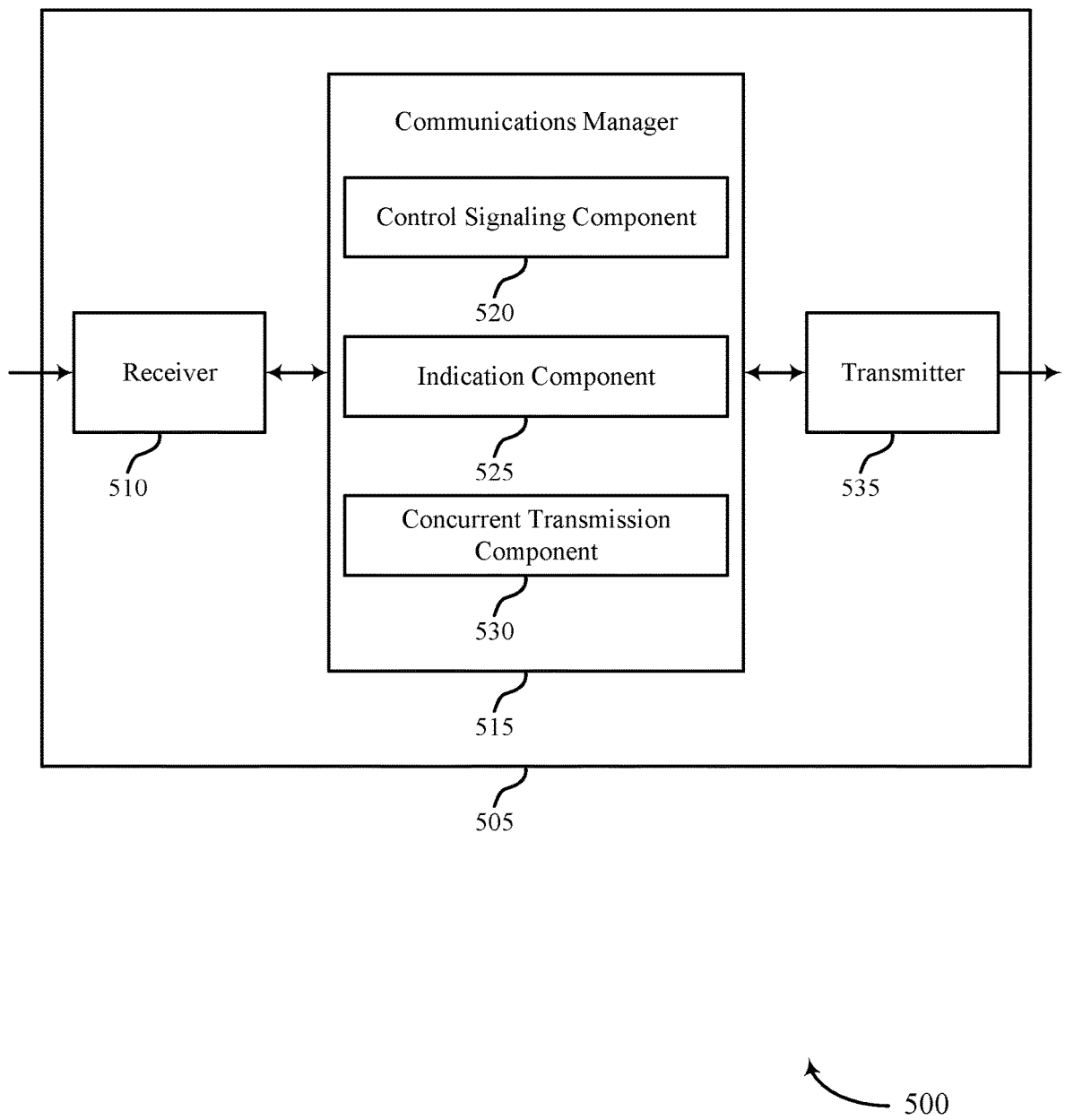

FIG. 5 shows a block diagram 500 of a device 505 that supports superposition of sidelink and uplink transmissions in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to superposition of sidelink and uplink transmissions, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control signaling component 520, an indication component 525, and a concurrent transmission component 530. The communications manager 515 may be an example of aspects of the communications manager 710 described herein.

The control signaling component 520 may receive, from a base station, control signaling indicating a sidelink resource pool allocated for sidelink communication between the first UE and a second UE.

The indication component 525 may transmit an indication that indicates superposition coding is being used or that indicates an intent to use superposition coding to generate a concurrent sidelink and uplink transmission.

The concurrent transmission component 530 may transmit the concurrent sidelink and uplink transmission within a resource of the sidelink resource pool based on the indication.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

A processor of a UE 115 (e.g., controlling the receiver 520, the transmitter 535, or the transceiver 720 as described with reference to FIG. 7) may efficiently measure channel quality of sidelink and uplink communication links. The processor of the UE 115 may further transmit, by operating transmitter 535, an indication that superposition coding may be used to generate a concurrent sidelink and uplink transmission. The processor of the UE 115 may operate transmitter 535 to transmit the concurrent sidelink and uplink transmission to a base station 105 and one or more other UEs 115. The processor of the UE 115 may further efficiently encode and operate components of the UE 115 to improve throughput and efficient transmission scheduling through transmission of control information to a base station 105 and other UEs 115. This may save power and increase battery life of the UE 115 by decreasing the number of retransmissions used to achieve successful decoding, while also efficiently utilizing resources by transmitted concurrent messages.

Figure 6:
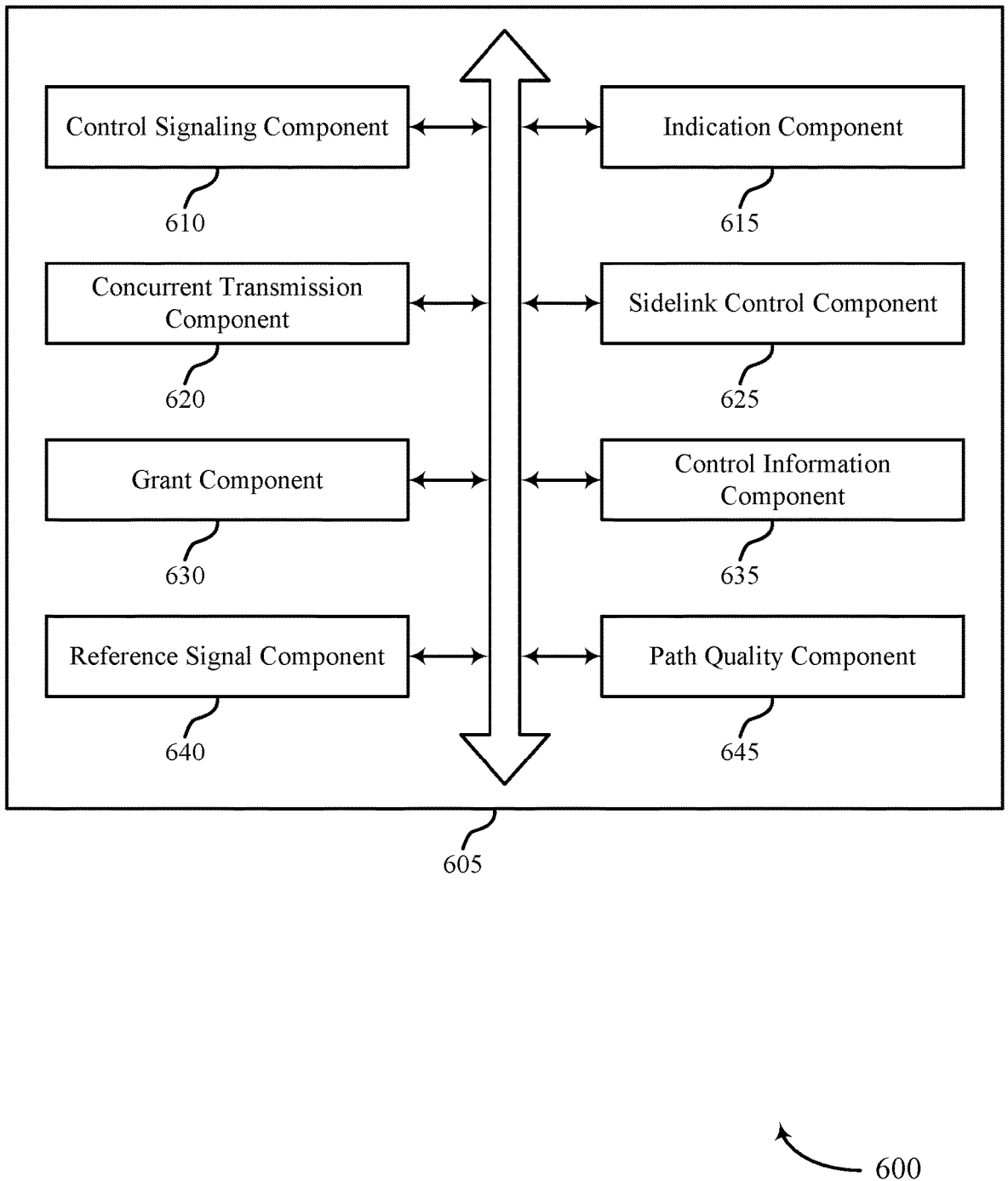
FIG. 6 shows a block diagram of a communications manager in accordance with aspects of the present disclosure.

FIG. 6 shows a block diagram 600 of a communications manager 605 that supports superposition of sidelink and uplink transmissions in accordance with aspects of the present disclosure. The communications manager 605 may be an example of aspects of a communications manager 415, a communications manager 515, or a communications manager 710 described herein. The communications manager 605 may include a control signaling component 610, an indication component 615, a concurrent transmission component 620, a sidelink control component 625, a grant component 630, a control information component 635, a reference signal component 640, and a path quality component 645. Each of these modules may communicate, directly or indirectly, with one another (e.g., via one or more buses).

The control signaling component 610 may receive, from a base station, control signaling indicating a sidelink resource pool allocated for sidelink communication between the first UE and a second UE.

The indication component 615 may transmit an indication that indicates superposition coding is being used or that indicates an intent to use superposition coding to generate a concurrent sidelink and uplink transmission.

In some examples, the indication component 615 may transmit the indication that indicates at least one future time and frequency resource within the sidelink resource pool to implicitly be an uplink reservation request.

The concurrent transmission component 620 may transmit the concurrent sidelink and uplink transmission within a resource of the sidelink resource pool based on the indication.

In some examples, the concurrent transmission component 620 may transmit the concurrent sidelink and uplink transmission based on a sidelink transmission encoded as a base layer of the concurrent sidelink and uplink transmission.

In some examples, the concurrent transmission component 620 may transmit the concurrent sidelink and uplink transmission based on an uplink transmission encoded as an enhancement layer of the concurrent sidelink and uplink transmission.

The sidelink control component 625 may transmit sidelink control information that includes the indication and indicates the resource of the sidelink resource pool.

In some examples, the sidelink control component 625 may transmit sidelink control information that indicates the resource of the sidelink resource pool as at least one future time and frequency resource within the sidelink resource pool.

In some examples, the sidelink control component 625 may transmit sidelink control information that includes an uplink reservation request for the resource of the sidelink resource pool.

The grant component 630 may receive a grant for uplink transmission via the resource of the sidelink resource pool based on the uplink reservation request.

The control information component 635 may transmit control information indicating at least one transmission parameter for the concurrent sidelink and uplink transmission, where the concurrent sidelink and uplink transmission is transmitted in accordance with the at least one transmission layer parameter.

In some examples, the control information component 635 may transmit the control information indicating the at least one transmission parameter that is a power split parameter between an uplink transmission of the concurrent sidelink and uplink transmission and a sidelink transmission of the concurrent sidelink and uplink transmission.

In some examples, the control information component 635 may transmit the control information indicating the at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

The reference signal component 640 may receive a reference signal from the base station, where the indication is transmitted based on a measurement of the reference signal.

The path quality component 645 may determine a sidelink path quality metric and an uplink path quality metric, where the indication is transmitted based on the sidelink path quality metric and the uplink path quality metric.

In some examples, the control signaling component 610 may receive a control message from the base station indicating a capability of the base station to support superposition coding. The indication component 615 may transmit the indication that indicates superposition coding is being used or that indicates the intent to use superposition coding to generate the concurrent sidelink and uplink transmission based on the control message.

Figure 7:
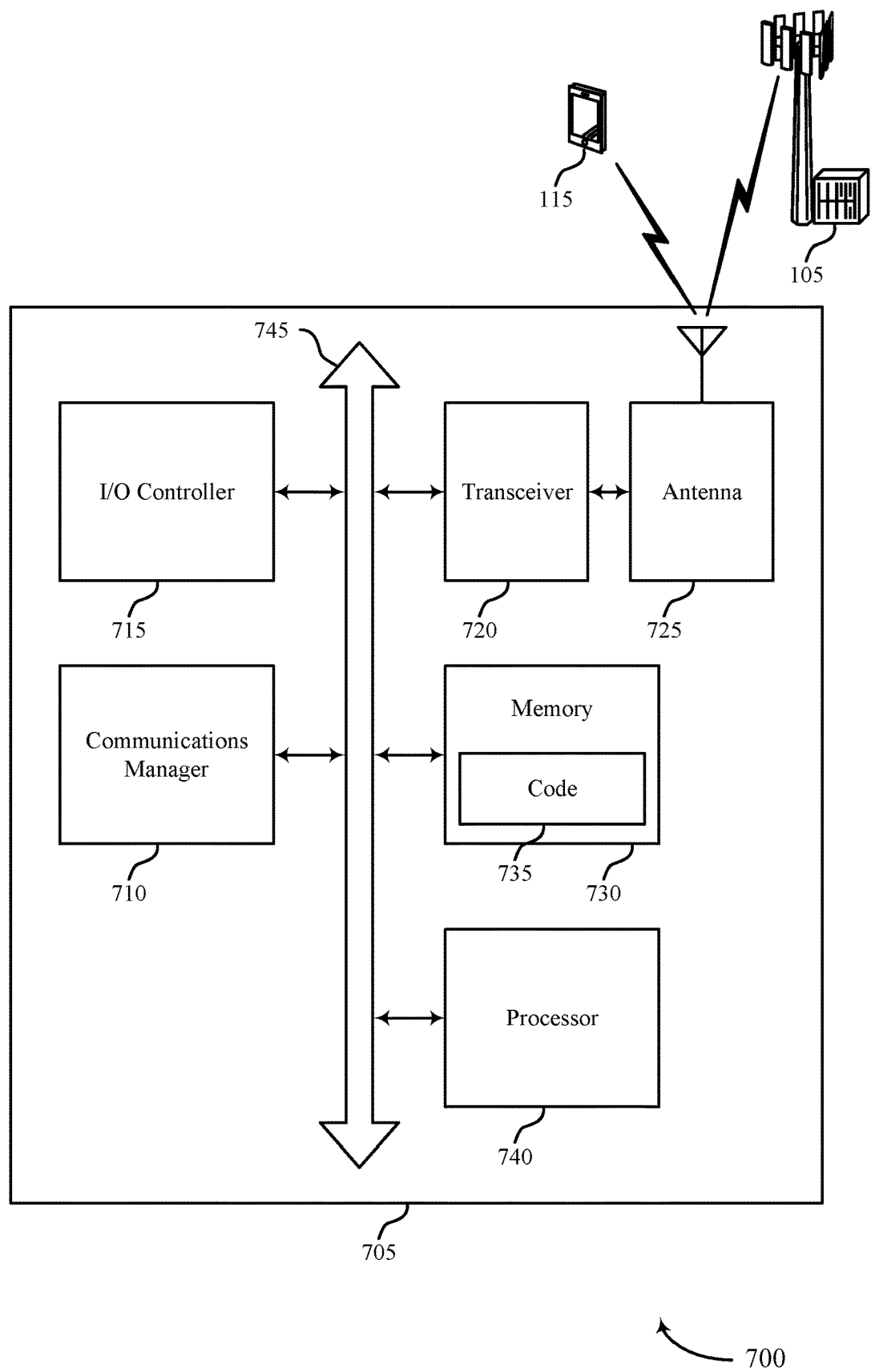
FIG. 7 shows a diagram of a system including a device in accordance with aspects of the present disclosure.

FIG. 7 shows a diagram of a system 700 including a device 705 that supports superposition of sidelink and uplink transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, control signaling indicating a sidelink resource pool allocated for sidelink communication between the first UE and a second UE, transmit an indication that indicates superposition coding is being used or that indicates an intent to use superposition coding to generate a concurrent sidelink and uplink transmission, and transmit the concurrent sidelink and uplink transmission within a resource of the sidelink resource pool based on the indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting superposition of sidelink and uplink transmissions).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
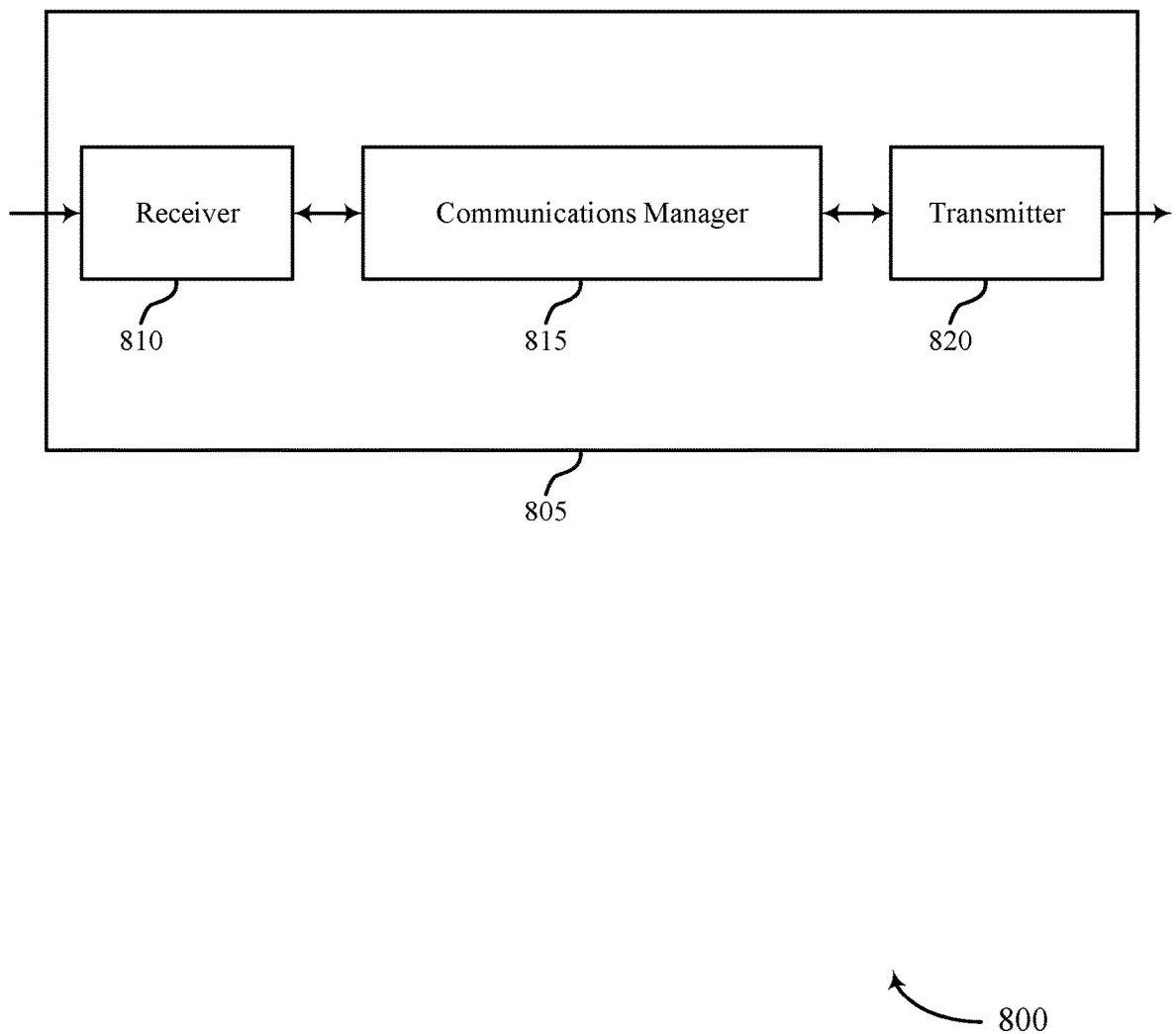
FIGS. 8 and 9 show block diagrams of devices in accordance with aspects of the present disclosure.

FIG. 8 shows a block diagram 800 of a device 805 that supports superposition of sidelink and uplink transmissions in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to superposition of sidelink and uplink transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a first UE, control signaling indicating a sidelink resource pool allocated for sidelink communication between the first UE and a second UE, receive an indication that indicates superposition coding is being used or that indicates an intent to use superposition coding to generate a concurrent sidelink and uplink transmission, and receive the concurrent sidelink and uplink transmission within a resource of the sidelink resource pool based on the indication. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its subcomponents may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
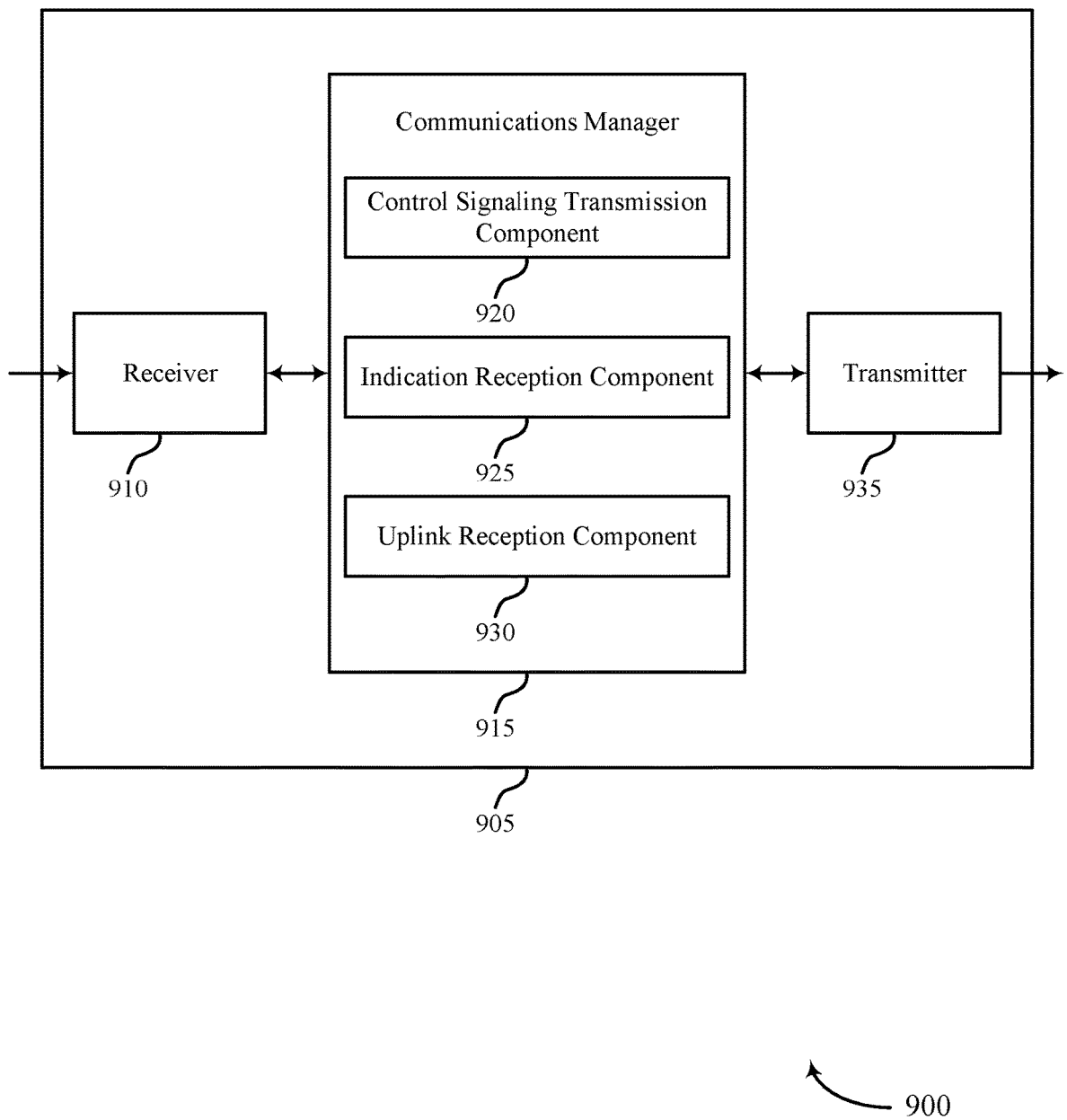

FIG. 9 shows a block diagram 900 of a device 905 that supports superposition of sidelink and uplink transmissions in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to superposition of sidelink and uplink transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control signaling transmission component 920, an indication reception component 925, and an uplink reception component 930. The communications manager 915 may be an example of aspects of the communications manager 1110 described herein.

The control signaling transmission component 920 may transmit, to a first UE, control signaling indicating a sidelink resource pool allocated for sidelink communication between the first UE and a second UE.

The indication reception component 925 may receive an indication that indicates superposition coding is being used or that indicates an intent to use superposition coding to generate a concurrent sidelink and uplink transmission.

The uplink reception component 930 may receive the concurrent sidelink and uplink transmission within a resource of the sidelink resource pool based on the indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
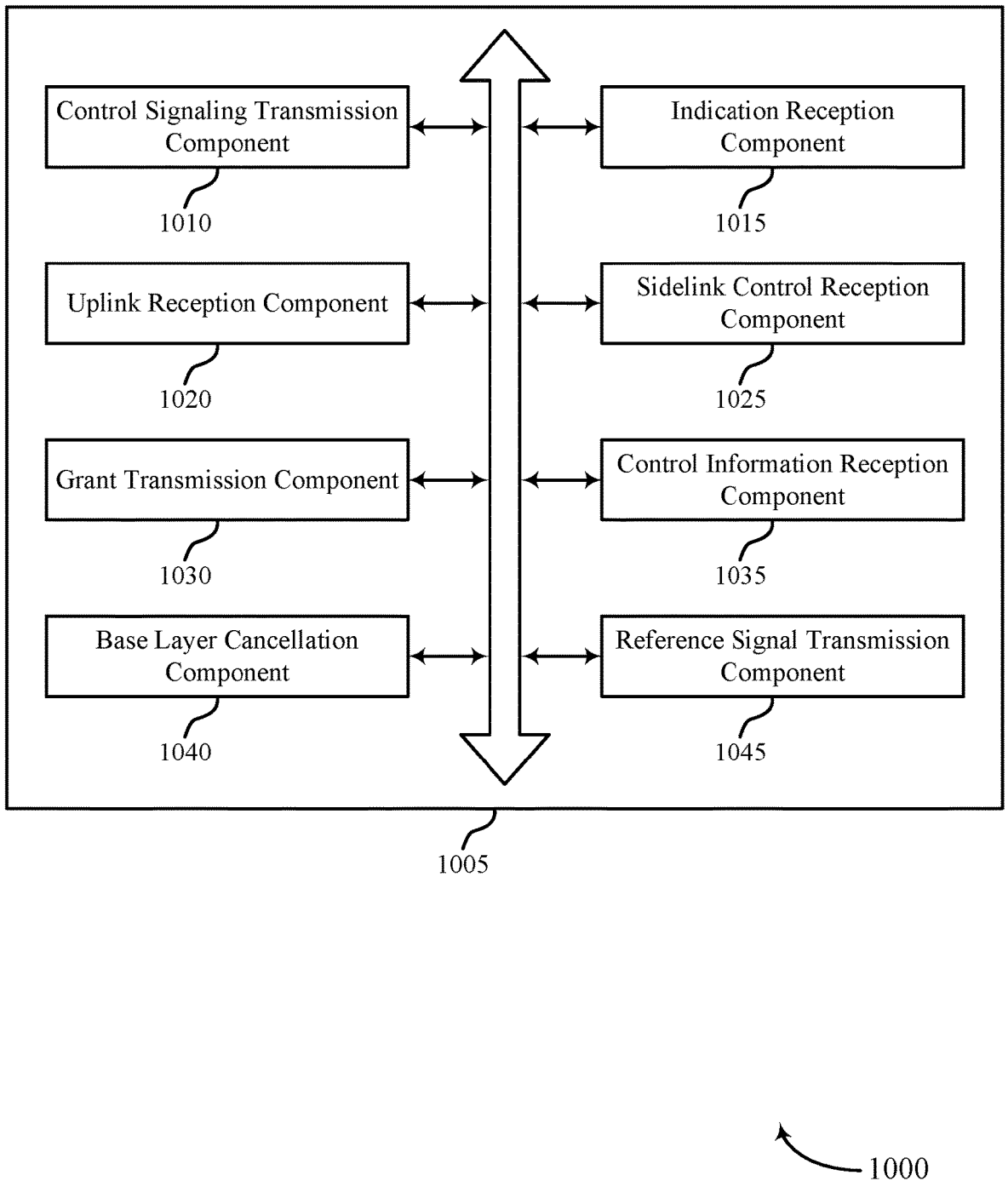
FIG. 10 shows a block diagram of a communications manager in accordance with aspects of the present disclosure.

FIG. 10 shows a block diagram 1000 of a communications manager 1005 that supports superposition of sidelink and uplink transmissions in accordance with aspects of the present disclosure. The communications manager 1005 may be an example of aspects of a communications manager 815, a communications manager 915, or a communications manager 1110 described herein. The communications manager 1005 may include a control signaling transmission component 1010, an indication reception component 1015, an uplink reception component 1020, a sidelink control reception component 1025, a grant transmission component 1030, a control information reception component 1035, a base layer cancellation component 1040, and a reference signal transmission component 1045. Each of these modules may communicate, directly or indirectly, with one another (e.g., via one or more buses).

The control signaling transmission component 1010 may transmit, to a first UE, control signaling indicating a sidelink resource pool allocated for sidelink communication between the first UE and a second UE.

The indication reception component 1015 may receive an indication that indicates superposition coding is being used or that indicates an intent to use superposition coding to generate a concurrent sidelink and uplink transmission.

In some examples, the indication reception component 1015 may receive the indication that indicates at least one future time and frequency resource within the sidelink resource pool to implicitly be an uplink reservation request.

The uplink reception component 1020 may receive the concurrent sidelink and uplink transmission within a resource of the sidelink resource pool based on the indication.

In some examples, the uplink reception component 1020 may receive the concurrent sidelink and uplink transmission based on a sidelink transmission encoded as a base layer of the concurrent sidelink and uplink transmission.

In some examples, the uplink reception component 1020 may receive the concurrent sidelink and uplink transmission based on an uplink transmission encoded as an enhancement layer of the concurrent sidelink and uplink transmission.

The sidelink control reception component 1025 may receive sidelink control information that includes the indication and indicates the resource of the sidelink resource pool.

In some examples, the sidelink control reception component 1025 may receive sidelink control information that indicates the resource of the sidelink resource pool as at least one future time and frequency resource within the sidelink resource pool.

In some examples, the sidelink control reception component 1025 may receive sidelink control information that includes an uplink reservation request for the resource of the sidelink resource pool.

The grant transmission component 1030 may transmit a grant for uplink transmission via the resource of the sidelink resource pool based on the uplink reservation request.

The control information reception component 1035 may receive control information indicating at least one transmission parameter for the concurrent sidelink and uplink transmission, where the concurrent sidelink and uplink transmission is received in accordance with the at least one transmission layer parameter.

In some examples, the control information reception component 1035 may receive the control information indicating the at least one transmission parameter that is a power split parameter between an uplink transmission of the concurrent sidelink and uplink transmission and a sidelink transmission of the concurrent sidelink and uplink transmission.

In some examples, the control information reception component 1035 may receive the control information indicating the at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

The base layer cancellation component 1040 may perform, based on the control information, base layer cancellation from the concurrent sidelink and uplink transmission to obtain an enhancement layer of the concurrent sidelink and uplink transmission.

The reference signal transmission component 1045 may transmit a reference signal, where the indication is received based on a measurement of the reference signal.

In some examples, the control signaling transmission component 1010 may transmit a control message to the UE indicating a capability of the base station to support superposition coding. The uplink reception component 1020 may receive the indication that indicates superposition coding is being used or that indicates the intent to use superposition coding to generate the concurrent sidelink and uplink transmission based on the control message.

Figure 11:
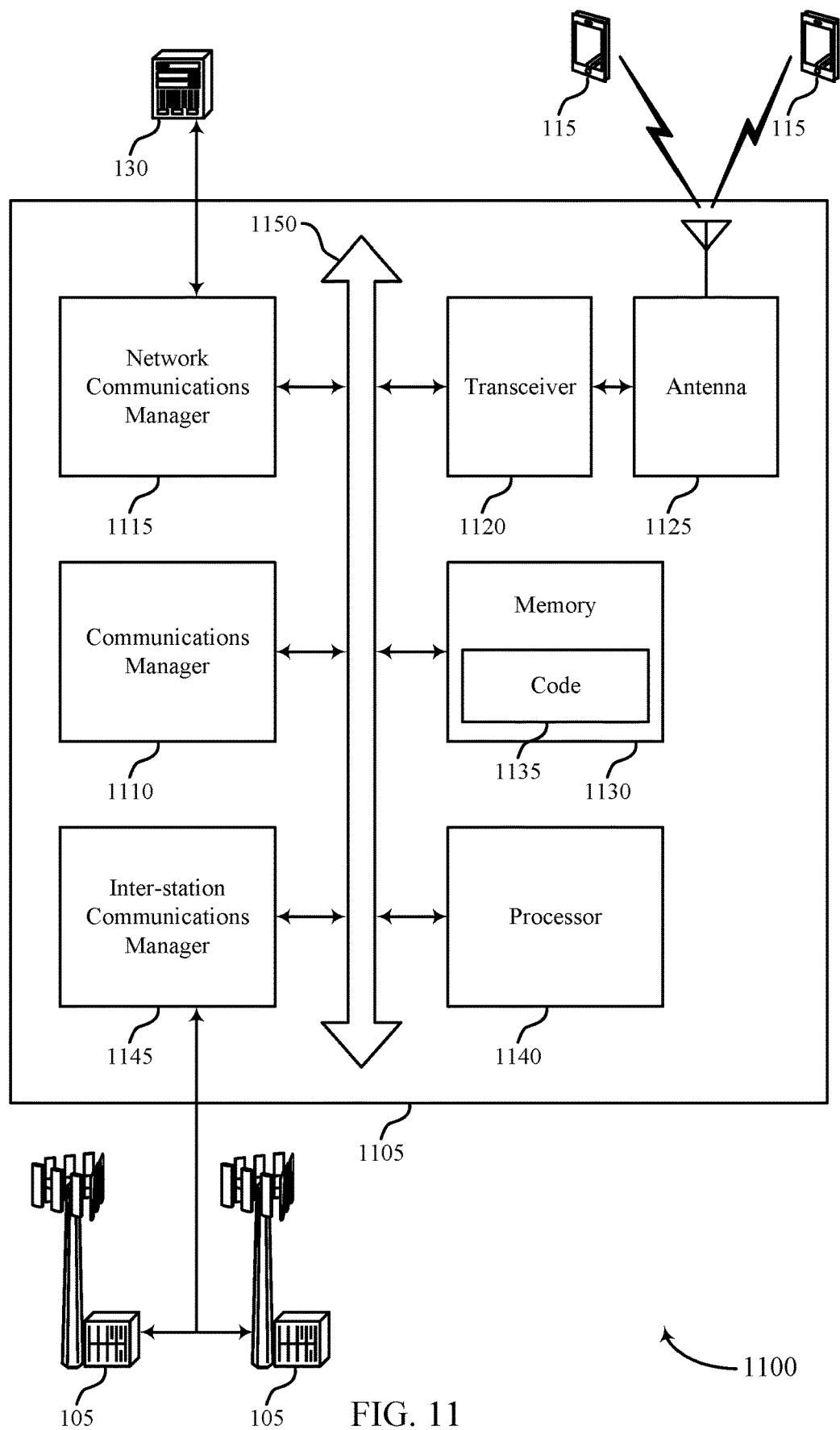
FIG. 11 shows a diagram of a system including a device in accordance with aspects of the present disclosure.

FIG. 11 shows a diagram of a system 1100 including a device 1105 that supports superposition of sidelink and uplink transmissions in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a first UE, control signaling indicating a sidelink resource pool allocated for sidelink communication between the first UE and a second UE, receive an indication that indicates superposition coding is being used or that indicates an intent to use superposition coding to generate a concurrent sidelink and uplink transmission, and receive the concurrent sidelink and uplink transmission within a resource of the sidelink resource pool based on the indication.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting superposition of sidelink and uplink transmissions).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
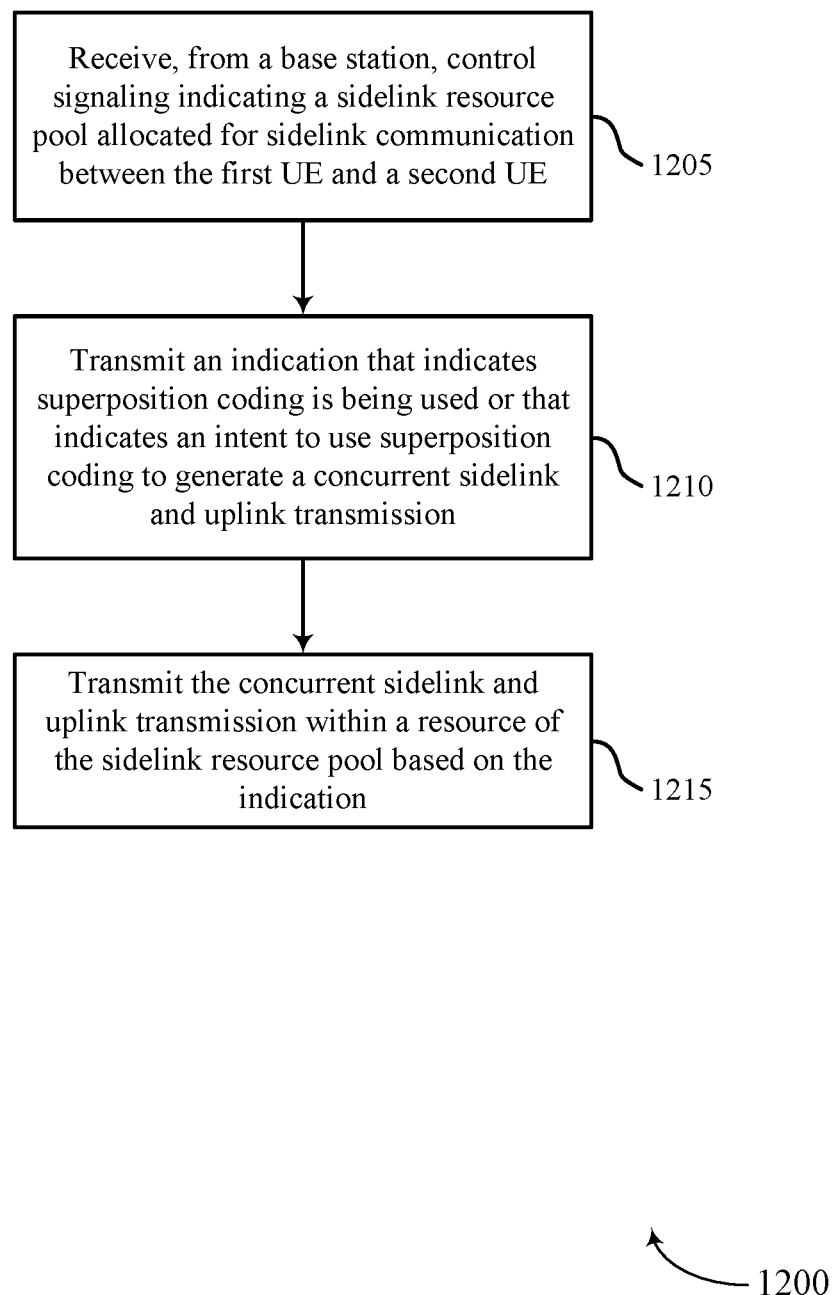
FIGS. 12 through 15 show flowcharts illustrating methods in accordance with aspects of the present disclosure.

FIG. 12 shows a flowchart illustrating a method 1200 that supports superposition of sidelink and uplink transmissions in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, control signaling indicating a sidelink resource pool allocated for sidelink communication between the first UE and a second UE. The operations of 1205 may be performed according to the methods described herein. In some examples, aspects of the operations of 1205 may be performed by a control signaling component as described with reference to FIGS. 4 through 7.

At 1210, the UE may transmit an indication that indicates superposition coding is being used or that indicates an intent to use superposition coding to generate a concurrent sidelink and uplink transmission. The operations of 1210 may be performed according to the methods described herein. In some examples, aspects of the operations of 1210 may be performed by an indication component as described with reference to FIGS. 4 through 7.

At 1215, the UE may transmit the concurrent sidelink and uplink transmission within a resource of the sidelink resource pool based on the indication. The operations of 1215 may be performed according to the methods described herein. In some examples, aspects of the operations of 1215 may be performed by a concurrent transmission component as described with reference to FIGS. 4 through 7.

Figure 13:
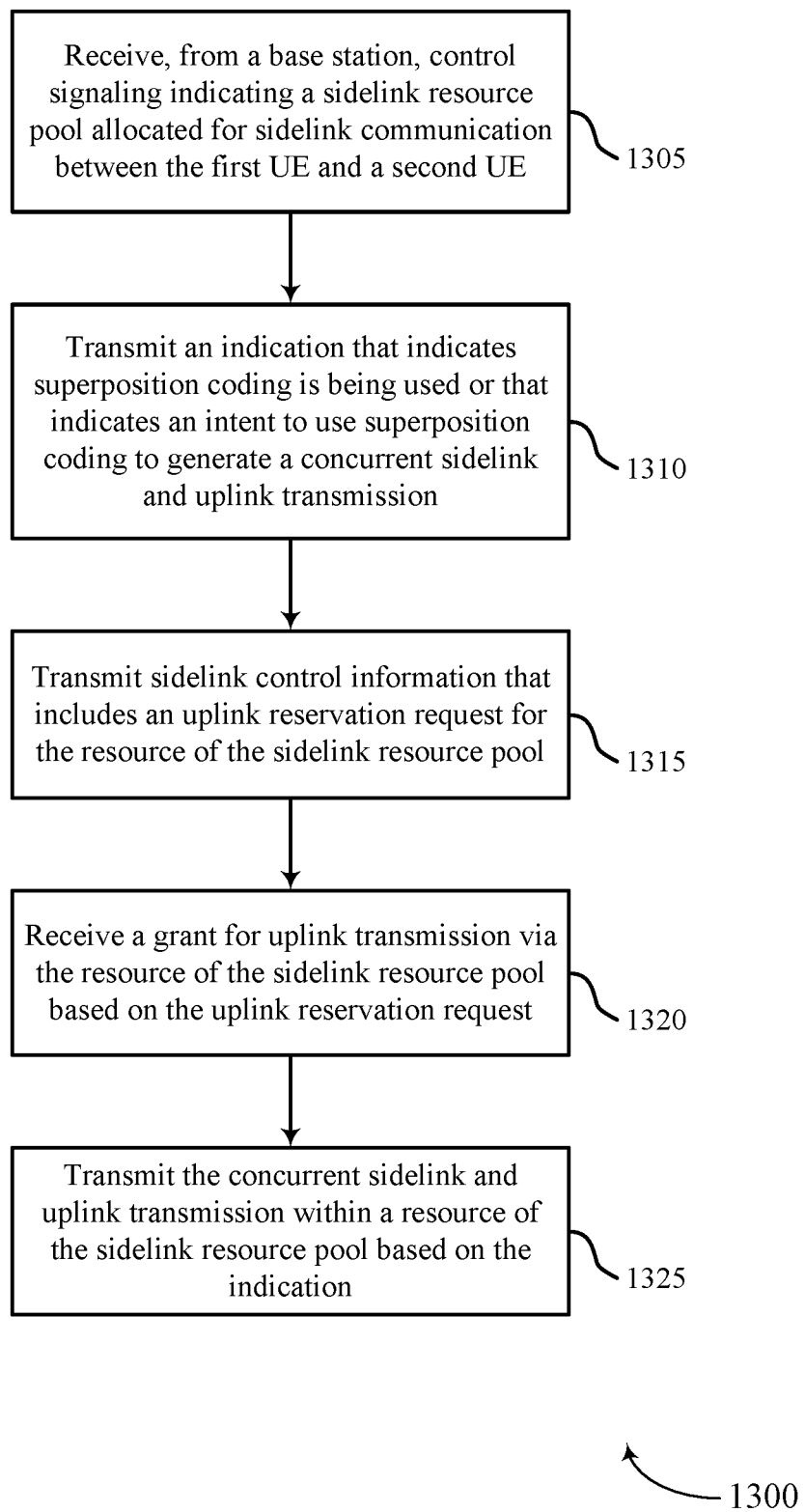

FIG. 13 shows a flowchart illustrating a method 1300 that supports superposition of sidelink and uplink transmissions in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, control signaling indicating a sidelink resource pool allocated for sidelink communication between the first UE and a second UE. The operations of 1305 may be performed according to the methods described herein. In some examples, aspects of the operations of 1305 may be performed by a control signaling component as described with reference to FIGS. 4 through 7.

At 1310, the UE may transmit an indication that indicates superposition coding is being used or that indicates an intent to use superposition coding to generate a concurrent sidelink and uplink transmission. The operations of 1310 may be performed according to the methods described herein. In some examples, aspects of the operations of 1310 may be performed by an indication component as described with reference to FIGS. 4 through 7.

At 1315, the UE may transmit sidelink control information that includes an uplink reservation request for the resource of the sidelink resource pool. The operations of 1315 may be performed according to the methods described herein. In some examples, aspects of the operations of 1315 may be performed by a sidelink control component as described with reference to FIGS. 4 through 7.

At 1320, the UE may receive a grant for uplink transmission via the resource of the sidelink resource pool based on the uplink reservation request. The operations of 1320 may be performed according to the methods described herein. In some examples, aspects of the operations of 1320 may be performed by a grant component as described with reference to FIGS. 4 through 7.

At 1325, the UE may transmit the concurrent sidelink and uplink transmission within a resource of the sidelink resource pool based on the indication. The operations of 1325 may be performed according to the methods described herein. In some examples, aspects of the operations of 1325 may be performed by a concurrent transmission component as described with reference to FIGS. 4 through 7.

Figure 14:
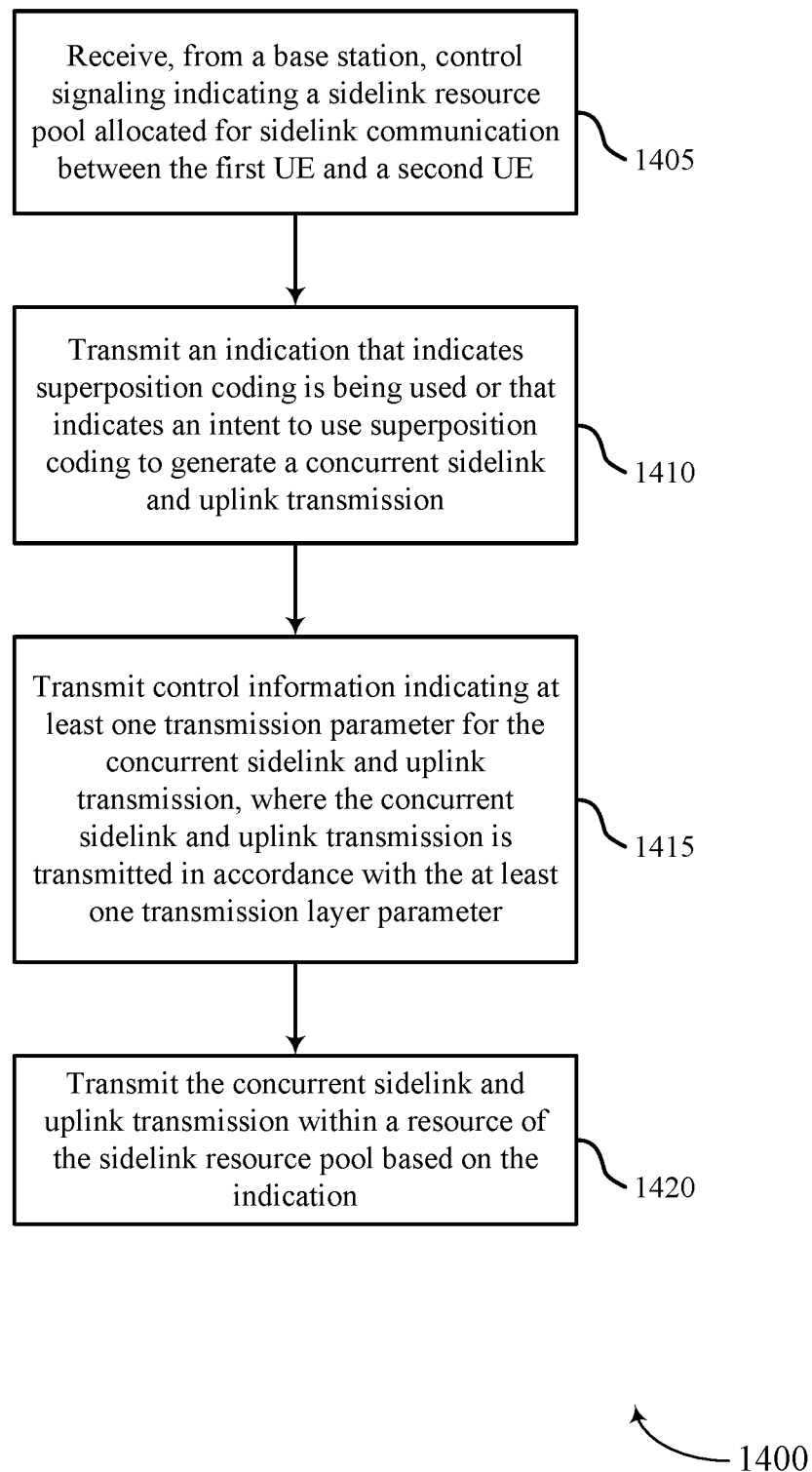

FIG. 14 shows a flowchart illustrating a method 1400 that supports superposition of sidelink and uplink transmissions in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, control signaling indicating a sidelink resource pool allocated for sidelink communication between the first UE and a second UE. The operations of 1405 may be performed according to the methods described herein. In some examples, aspects of the operations of 1405 may be performed by a control signaling component as described with reference to FIGS. 4 through 7.

At 1410, the UE may transmit an indication that indicates superposition coding is being used or that indicates an intent to use superposition coding to generate a concurrent sidelink and uplink transmission. The operations of 1410 may be performed according to the methods described herein. In some examples, aspects of the operations of 1410 may be performed by an indication component as described with reference to FIGS. 4 through 7.

At 1415, the UE may transmit control information indicating at least one transmission parameter for the concurrent sidelink and uplink transmission, where the concurrent sidelink and uplink transmission is transmitted in accordance with the at least one transmission layer parameter. The operations of 1415 may be performed according to the methods described herein. In some examples, aspects of the operations of 1415 may be performed by a control information component as described with reference to FIGS. 4 through 7.

At 1420, the UE may transmit the concurrent sidelink and uplink transmission within a resource of the sidelink resource pool based on the indication. The operations of 1420 may be performed according to the methods described herein. In some examples, aspects of the operations of 1420 may be performed by a concurrent transmission component as described with reference to FIGS. 4 through 7.

Figure 15:
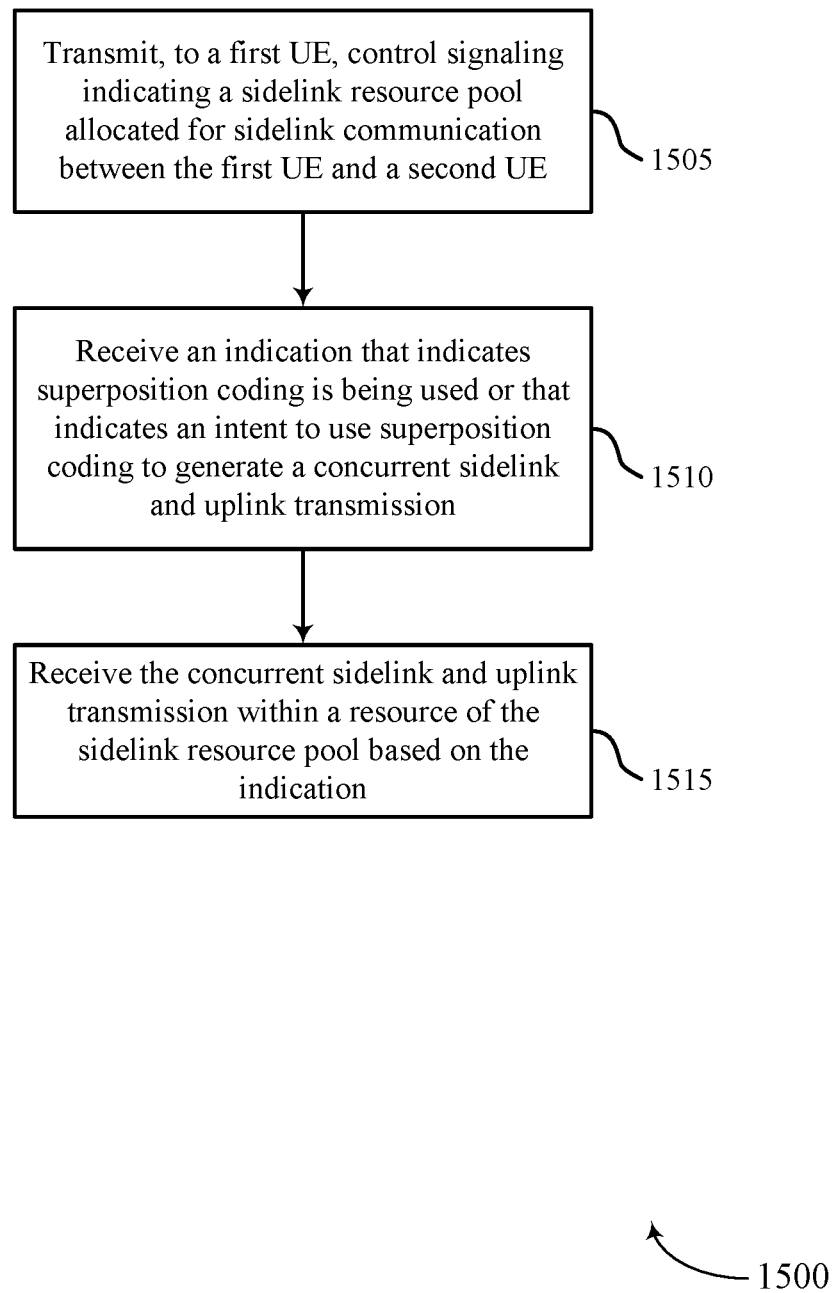

FIG. 15 shows a flowchart illustrating a method 1500 that supports superposition of sidelink and uplink transmissions in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit, to a first UE, control signaling indicating a sidelink resource pool allocated for sidelink communication between the first UE and a second UE. The operations of 1505 may be performed according to the methods described herein. In some examples, aspects of the operations of 1505 may be performed by a control signaling transmission component as described with reference to FIGS. 8 through 11.

At 1510, the base station may receive an indication that indicates superposition coding is being used or that indicates an intent to use superposition coding to generate a concurrent sidelink and uplink transmission. The operations of 1510 may be performed according to the methods described herein. In some examples, aspects of the operations of 1510 may be performed by an indication reception component as described with reference to FIGS. 8 through 11.

At 1515, the base station may receive the concurrent sidelink and uplink transmission within a resource of the sidelink resource pool based on the indication. The operations of 1515 may be performed according to the methods described herein. In some examples, aspects of the operations of 1515 may be performed by an uplink reception component as described with reference to FIGS. 8 through 11.

The following provides an overview of aspects of the present disclosure:

Aspect 1: A method for wireless communications by a first UE, comprising: receiving, from a base station, control signaling indicating a sidelink resource pool allocated for sidelink communication between the first UE and a second UE; transmitting an indication that indicates superposition coding is being used or that indicates an intent to use superposition coding to generate a concurrent sidelink and uplink transmission; and transmitting the concurrent sidelink and uplink transmission within a resource of the sidelink resource pool based at least in part on the indication.

Aspect 2: The method of aspect 1, wherein transmitting the concurrent sidelink and uplink transmission comprises: transmitting the concurrent sidelink and uplink transmission based at least in part on a sidelink transmission encoded as a base layer of the concurrent sidelink and uplink transmission.

Aspect 3: The method of any of aspects 1 through 2, wherein transmitting the concurrent sidelink and uplink transmission comprises: transmitting the concurrent sidelink and uplink transmission based at least in part on an uplink transmission encoded as an enhancement layer of the concurrent sidelink and uplink transmission.

Aspect 4: The method of any of aspects 1 through 3, wherein transmitting the indication comprises: transmitting sidelink control information that includes the indication and indicates the resource of the sidelink resource pool.

Aspect 5: The method of any of aspects 1 through 4, wherein transmitting the indication comprises: transmitting sidelink control information that indicates the resource of the sidelink resource pool as at least one future time and frequency resource within the sidelink resource pool.

Aspect 6: The method of any of aspects 1 through 5, wherein transmitting the indication comprises: transmitting the indication that indicates at least one future time and frequency resource within the sidelink resource pool to implicitly be an uplink reservation request.

Aspect 7: The method of any of aspects 1 through 6, wherein transmitting the indication comprises: transmitting sidelink control information that includes an uplink reservation request for the resource of the sidelink resource pool.

Aspect 8: The method of aspect 7, further comprising: receiving a grant for uplink transmission via the resource of the sidelink resource pool based at least in part on the uplink reservation request.

Aspect 9: The method of any of aspects 1 through 8, further comprising: transmitting control information indicating at least one transmission parameter for the concurrent sidelink and uplink transmission, wherein the concurrent sidelink and uplink transmission is transmitted in accordance with the at least one transmission layer parameter.

Aspect 10: The method of aspect 9, wherein transmitting the control information comprises: transmitting the control information indicating the at least one transmission parameter that is a power split parameter between an uplink transmission of the concurrent sidelink and uplink transmission and a sidelink transmission of the concurrent sidelink and uplink transmission.

Aspect 11: The method of any of aspects 9 through 10, wherein transmitting the control information comprises: transmitting the control information indicating the at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

Aspect 12: The method of any of aspects 1 through 11, further comprising: receiving a reference signal from the base station, wherein the indication is transmitted based at least in part on a measurement of the reference signal.

Aspect 13: The method of any of aspects 1 through 12, further comprising: determining a sidelink path quality metric and an uplink path quality metric, wherein the indication is transmitted based at least in part on the sidelink path quality metric and the uplink path quality metric.

Aspect 14: The method of any of aspects 1 through 13, further comprising: receiving a control message from the base station indicating a capability of the base station to support superposition coding; and transmitting the indication that indicates superposition coding is being used or that indicates the intent to use superposition coding to generate the concurrent sidelink and uplink transmission based at least in part on the control message.

Aspect 15: A method for wireless communications by a base station, comprising: transmitting, to a first UE, control signaling indicating a sidelink resource pool allocated for sidelink communication between the first UE and a second UE; receiving an indication that indicates superposition coding is being used or that indicates an intent to use superposition coding to generate a concurrent sidelink and uplink transmission; and receiving the concurrent sidelink and uplink transmission within a resource of the sidelink resource pool based at least in part on the indication.

Aspect 16: The method of aspect 15, wherein receiving the concurrent sidelink and uplink transmission comprises: receiving the concurrent sidelink and uplink transmission based at least in part on a sidelink transmission encoded as a base layer of the concurrent sidelink and uplink transmission.

Aspect 17: The method of any of aspects 15 through 16, wherein receiving the concurrent sidelink and uplink transmission comprises: receiving the concurrent sidelink and uplink transmission based at least in part on an uplink transmission encoded as an enhancement layer of the concurrent sidelink and uplink transmission.

Aspect 18: The method of any of aspects 15 through 17, wherein receiving the indication comprises: receiving sidelink control information that includes the indication and indicates the resource of the sidelink resource pool.

Aspect 19: The method of any of aspects 15 through 18, wherein receiving the indication comprises: receiving sidelink control information that indicates the resource of the sidelink resource pool as at least one future time and frequency resource within the sidelink resource pool.

Aspect 20: The method of any of aspects 15 through 19, wherein receiving the indication comprises: receiving the indication that indicates at least one future time and frequency resource within the sidelink resource pool to implicitly be an uplink reservation request.

Aspect 21: The method of any of aspects 15 through 20, wherein receiving the indication comprises: receiving sidelink control information that includes an uplink reservation request for the resource of the sidelink resource pool.

Aspect 22: The method of aspect 21, further comprising: transmitting a grant for uplink transmission via the resource of the sidelink resource pool based at least in part on the uplink reservation request.

Aspect 23: The method of any of aspects 15 through 22, further comprising: receiving control information indicating at least one transmission parameter for the concurrent sidelink and uplink transmission, wherein the concurrent sidelink and uplink transmission is received in accordance with the at least one transmission layer parameter.

Aspect 24: The method of aspect 23, wherein receiving the control information comprises: performing, based at least in part on the control information, base layer cancellation from the concurrent sidelink and uplink transmission to obtain an enhancement layer of the concurrent sidelink and uplink transmission.

Aspect 25: The method of any of aspects 23 through 24, wherein receiving the control information comprises: receiving the control information indicating the at least one transmission parameter that is a power split parameter between an uplink transmission of the concurrent sidelink and uplink transmission and a sidelink transmission of the concurrent sidelink and uplink transmission.

Aspect 26: The method of any of aspects 23 through 25, wherein receiving the control information comprises: receiving the control information indicating the at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

Aspect 27: The method of any of aspects 15 through 26, further comprising: transmitting a reference signal, wherein the indication is received based at least in part on a measurement of the reference signal.

Aspect 28: The method of any of aspects 15 through 27, further comprising: transmitting a control message to the UE indicating a capability of the base station to support superposition coding; and receiving the indication that indicates superposition coding is being used or that indicates the intent to use superposition coding to generate the concurrent sidelink and uplink transmission based at least in part on the control message.

Aspect 29: An apparatus for wireless communications by a first UE, comprising a processor; memory coupled with the processor; and instructions stored in the memory and executable by the processor to cause the apparatus to perform a method of any of aspects 1 through 14.

Aspect 30: An apparatus for wireless communications by a first UE, comprising at least one means for performing a method of any of aspects 1 through 14.

Aspect 31: A non-transitory computer-readable medium storing code for wireless communications by a first UE, the code comprising instructions executable by a processor to perform a method of any of aspects 1 through 14.

Aspect 32: An apparatus for wireless communications by a base station, comprising a processor; memory coupled with the processor; and instructions stored in the memory and executable by the processor to cause the apparatus to perform a method of any of aspects 15 through 28.

Aspect 33: An apparatus for wireless communications by a base station, comprising at least one means for performing a method of any of aspects 15 through 28.

Aspect 34: A non-transitory computer-readable medium storing code for wireless communications by a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
    receiving, from a network device, control signaling indicating a sidelink resource pool allocated for sidelink communication between the first UE and a second UE;
    transmitting, by the first UE, an indication that indicates superposition coding is being used or that indicates an intent to use superposition coding to generate a concurrent sidelink and uplink transmission; and
    transmitting the concurrent sidelink and uplink transmission within a resource of the sidelink resource pool and in accordance with the superposition coding based at least in part on the indication.

2. The method of claim 1, wherein transmitting the concurrent sidelink and uplink transmission comprises:
    transmitting the concurrent sidelink and uplink transmission based at least in part on a sidelink transmission encoded as a base layer of the concurrent sidelink and uplink transmission.

3. The method of claim 1, wherein transmitting the concurrent sidelink and uplink transmission comprises:
    transmitting the concurrent sidelink and uplink transmission based at least in part on an uplink transmission encoded as an enhancement layer of the concurrent sidelink and uplink transmission.

4. The method of claim 1, wherein transmitting the indication comprises:
    transmitting sidelink control information that includes the indication and indicates the resource of the sidelink resource pool.

5. The method of claim 1, wherein transmitting the indication comprises:
    transmitting sidelink control information that indicates the resource of the sidelink resource pool as at least one upcoming time and frequency resource within the sidelink resource pool.

6. The method of claim 1, wherein transmitting the indication comprises:
    transmitting the indication that indicates at least one upcoming time and frequency resource within the sidelink resource pool to implicitly be an uplink reservation request.

7. The method of claim 1, wherein transmitting the indication comprises:
    transmitting sidelink control information that includes an uplink reservation request for the resource of the sidelink resource pool.

8. The method of claim 7, further comprising:
    receiving a grant for uplink transmission via the resource of the sidelink resource pool based at least in part on the uplink reservation request.

9. The method of claim 1, further comprising:
    transmitting control information indicating at least one transmission parameter for the concurrent sidelink and uplink transmission, wherein the concurrent sidelink and uplink transmission is transmitted in accordance with at least one transmission layer parameter.

10. The method of claim 1, further comprising:
    transmitting control information indicating at least one transmission parameter that is a power split parameter between an uplink transmission of the concurrent sidelink and uplink transmission and a sidelink transmission of the concurrent sidelink and uplink transmission.

11. The method of claim 1, further comprising:
transmitting control information indicating at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

12. The method of claim 1, further comprising:
receiving a reference signal from the network device, wherein the indication is transmitted based at least in part on a measurement of the reference signal.

13. The method of claim 1, further comprising:
determining a sidelink path quality metric and an uplink path quality metric, wherein the indication is transmitted based at least in part on the sidelink path quality metric and the uplink path quality metric.

14. The method of claim 1, further comprising:
receiving a control message from the network device indicating a capability of the network device to support the superposition coding; and
transmitting the indication that indicates the superposition coding is being used or that indicates the intent to use the superposition coding to generate the concurrent sidelink and uplink transmission based at least in part on the control message.

15. A method for wireless communications by a network device, comprising:
transmitting, to a first user equipment (UE), control signaling indicating a sidelink resource pool allocated for sidelink communication between the first UE and a second UE;
receiving, from the first UE, an indication that indicates superposition coding is being used or that indicates an intent to use superposition coding to generate a concurrent sidelink and uplink transmission; and
receiving the concurrent sidelink and uplink transmission within a resource of the sidelink resource pool and in accordance with the superposition coding based at least in part on the indication.

16. The method of claim 15, wherein receiving the concurrent sidelink and uplink transmission comprises:
receiving the concurrent sidelink and uplink transmission based at least in part on a sidelink transmission encoded as a base layer of the concurrent sidelink and uplink transmission.

17. The method of claim 15, wherein receiving the concurrent sidelink and uplink transmission comprises:
receiving the concurrent sidelink and uplink transmission based at least in part on an uplink transmission encoded as an enhancement layer of the concurrent sidelink and uplink transmission.

18. The method of claim 15, wherein receiving the indication comprises:
receiving sidelink control information that includes the indication and indicates the resource of the sidelink resource pool.

19. The method of claim 15, wherein receiving the indication comprises:
receiving sidelink control information that indicates the resource of the sidelink resource pool as at least one upcoming time and frequency resource within the sidelink resource pool.

20. The method of claim 15, wherein receiving the indication comprises:
receiving the indication that indicates at least one upcoming time and frequency resource within the sidelink resource pool to implicitly be an uplink reservation request.

21. The method of claim 15, wherein receiving the indication comprises:
receiving sidelink control information that includes an uplink reservation request for the resource of the sidelink resource pool.

22. The method of claim 21, further comprising:
transmitting a grant for uplink transmission via the resource of the sidelink resource pool based at least in part on the uplink reservation request.

23. The method of claim 15, further comprising:
receiving control information indicating at least one transmission parameter for the concurrent sidelink and uplink transmission, wherein the concurrent sidelink and uplink transmission is received in accordance with at least one transmission layer parameter.

24. The method of claim 23, wherein receiving the control information comprises:
performing, based at least in part on the control information, base layer cancellation from the concurrent sidelink and uplink transmission to obtain an enhancement layer of the concurrent sidelink and uplink transmission.

25. The method of claim 15, further comprising:
receiving control information indicating at least one transmission parameter that is a power split parameter between an uplink transmission of the concurrent sidelink and uplink transmission and a sidelink transmission of the concurrent sidelink and uplink transmission.

26. The method of claim 15, further comprising:
receiving control information indicating at least one transmission parameter that is a first modulation and coding scheme parameter for an uplink transmission of the concurrent sidelink and uplink transmission and a second modulation and coding scheme parameter for a sidelink transmission of the concurrent sidelink and uplink transmission.

27. The method of claim 15, further comprising:
transmitting a reference signal, wherein the indication is received based at least in part on a measurement of the reference signal.

28. The method of claim 15, further comprising:
transmitting a control message to the UE indicating a capability of the network device to support the superposition coding; and
receiving the indication that indicates the superposition coding is being used or that indicates the intent to use the superposition coding to generate the concurrent sidelink and uplink transmission based at least in part on the control message.

29. An apparatus for wireless communications by a first user equipment (UE), comprising:
a processor;
a transceiver,
memory coupled with the processor; and
instructions stored in the memory and executable by the processor to cause the apparatus to:
receive, from a network device, control signaling indicating a sidelink resource pool allocated for sidelink communication between the first UE and a second UE;
transmit, via the transceiver of the first UE, an indication that indicates superposition coding is being used or that indicates an intent to use superposition coding to generate a concurrent sidelink and uplink transmission; and transmit the concurrent sidelink and uplink transmission within a resource of the sidelink resource pool and in accordance with the superposition coding based at least in part on the indication.

30. An apparatus for wireless communications by a network device, comprising:

a processor;

a transceiver;

memory coupled with the processor; and instructions stored in the memory and executable by the processor to cause the apparatus to:

transmit, via the transceiver, to a first user equipment (UE), control signaling indicating a sidelink resource pool allocated for sidelink communication between the first UE and a second UE;

receive, from the first UE, an indication that indicates superposition coding is being used or that indicates an intent to use superposition coding to generate a concurrent sidelink and uplink transmission; and receive the concurrent sidelink and uplink transmission within a resource of the sidelink resource pool and in accordance with the superposition coding based at least in part on the indication.

* * * * *